US007593603B1

(12) United States Patent
Wilensky

(10) Patent No.: US 7,593,603 B1
(45) Date of Patent: Sep. 22, 2009

(54) MULTI-BEHAVIOR IMAGE CORRECTION TOOL

(75) Inventor: Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 835 days.

(21) Appl. No.: 11/001,340

(22) Filed: Nov. 30, 2004

(51) Int. Cl.
*G06K 9/03* (2006.01)
*G06K 15/02* (2006.01)

(52) U.S. Cl. ..................... 382/311; 358/1.2

(58) Field of Classification Search ............ 382/162, 382/167, 274, 275, 305, 311, 299; 348/247; 358/1.9, 1.2, 3.27; 345/600
See application file for complete search history.

(56) References Cited

U.S. PATENT DOCUMENTS

| 6,337,925 | B1 | 1/2002 | Cohen |
| 6,456,297 | B1 | 9/2002 | Wilensky |
| 6,469,805 | B1 * | 10/2002 | Behlok ................ 358/1.9 |
| 7,085,437 | B2 * | 8/2006 | Nakajima et al. ......... 382/311 |
| 2002/0118875 | A1 | 8/2002 | Wilensky |
| 2002/0130908 | A1 | 9/2002 | Wilensky |
| 2003/0099411 | A1 | 5/2003 | Kokemohr |
| 2003/0223622 | A1 * | 12/2003 | Simon et al. ............ 382/118 |

FOREIGN PATENT DOCUMENTS

WO  WO-0186375 A3  11/2001
WO  WO-2004031991 A1  4/2004

OTHER PUBLICATIONS

"Adobe Photoshop CS: The New Color Replacement Tool", *The National Association of Photoshop Professionals*, (2004),1-4.
"At a Glance", *Adobe Photoshop CS with Adobe ImageReady CS*, (2003),1-2.
"Digital Photography Review", *Adobe Photshop CS Review p. 1 Operation*, (Sep. 2003),1-3.
"Entensis Mask Pro 3 Users Guide", (2003),1-53.
"Evaluation Guide", *Extensis, Mask Pro 3, Unmatched Masking Power and Precision*, (2003),1-29.
"Getting Started with Adobe Photoshop 6.0", *ITS Training, Short Course*, (Sep. 27, 2001),1-18.
"Image Enhancement—Understanding the Basics of Photoshop", *UPENN, Department of City & RegionalPlanning Support System, Fall 2003*, (2003),1-24.
"The Professional Standard in Desktop Digital Imaging", *Adobe Photoshop cs, Features*, (Sep. 2003),1-6.

(Continued)

*Primary Examiner*—Kanji Patel
(74) *Attorney, Agent, or Firm*—Schwegman, Lundberg & Woessner, P.A.

(57) ABSTRACT

A system to perform modifications, or adjustments, to a digital image includes an interface component to receive selection input to enable selection of the digital data to be modified. A detector then detects a characteristic of the digital data. A configurator automatically configures a function, supported by a data modification component, to modify the digital data. The automatic configuration of the function is performed using the detected characteristic of the digital data to be modified.

73 Claims, 13 Drawing Sheets

OTHER PUBLICATIONS

"Unmatched Masking Power & Precision", *Extensis Masko Pro 3; more Control and Precision for Unmatched Masking Results*, (2003),1.

"Using Layer Comps", *Adobe Photoshop CS*, Tutorial,(2003),1-2.

"Working with Selections", *Adobe Photoshop 5.0*, Tutorial excerpted from Adobe Photoshop Classroom in a Book,(1998),1-14.

Comaniciu, Dorin, et al., "Kernel-Based Object Tracking", *2000 IEEE Conference on Computer Vision and Pattern Recognition.*, 1-30.

Comaniciu, Dorin, et al., "Robust Detection and Tracking of Human Faces with an Active Camera", *2000 IEEE*, 0-7695-0698-04/00,(2000),1-8.

Comanisiu, Dorin, et al., "Real-Time Tracking of Non-Rigid Objects using Mean Shift", *IEEE CVPR 2000*, (2000),1-8.

Kelby, Scott, "Retouching Tips: Enhancing Eyes, Eyelashed, and More!", *Adobe Photoshop CS, Tutorial*, (2003),1-3.

Wang, A, et al., "On fast FIR filters implemented as tail-canceling IIR filters", *IEEE Transactions on [see also Acoustics, Speech, and Signal Processing, IEEE Transactions on] Signal Processing*, 45(6), (Jun. 1997),1415-1427.

* cited by examiner

170

180

190

200

230

240

MULTI-BEHAVIOR IMAGE CORRECTION TOOL

FIELD OF TECHNOLOGY

The present application relates generally to the technical fields of computer graphics processing, operator interface processing, and selective visual display systems and, in one exemplary embodiment, to a method and a system to modify to digital data.

BACKGROUND

The performance of activities (e.g., adjustments, modifications, editing, analysis etc.) relating to digital data is facilitated by many existing tools. Take, for example, the process of modifying a digital image by a user utilizing an image editing application. The user may make global image adjustments (e.g., the overall lighting and color balance of the global image is modified), or the user may elect to modify local regions of the digital image. After a global adjustment has been made, one object (or feature) of the image may be too dark and need to be lightened. A face of a person appearing in the digital image may be too saturated, or the user may desire to change the color hue of a flower, for example, from red to pink or purple.

One example of an image editing application is the ADOBE® PHOTOSHOP® image editing application, developed by Adobe System, Inc. of San Jose, Calif. The ADOBE® PHOTOSHOP® application provides a feature (or tool) called the Color Replacement Brush, which allows a user to create and save constant "brushes" with precise settings, including size, shape, tilt, spacing, scatter, jitter, etc. The ADOBE® PHOTOSHOP® application further provides so-called "Adjustment Layers," which enable localized adjustment of an image.

The basic behavior of tools provided by the above-mentioned applications is, however, constant. Further, the behavior of such tools is dictated largely by parameter values that are provided by user input. The provision of such parameter values typically requires a deep understanding regarding various input dialog boxes, and the functioning and effects of various tools of an image editing application. This understanding may be lacking in, and in fact not required by, certain users. For example, certain users may utilize only a certain high-level functionality provided by an image editing application.

While image editing applications have traditionally been limited to applications that execute on a personal computer (e.g., a desktop or a laptop computer), the increasing popularity and availability of portable computing devices has led to the development of image editing applications for such portable devices (e.g., cellular telephones and Personal Digital Assistants (PDAs)). The desirability of having image editing applications which execute on portable computing devices has been increased by the incorporation of camera capabilities into portable computing devices. For example, a large number of cellular telephones and PDAs currently on the market have built-in cameras. Further, a number of these computing devices have the capability to store and display photographs received, for example, by email or from another computing device with which they can be synchronized. The users of such portable computing devices may, on occasion, wish to perform image editing operations with respect to images stored on a portable computing device.

The input of parameter values however becomes more difficult on smaller devices (e.g., Personal Digital Assistants (PDAs) and cellular telephones). The display of easily navigable menus and interfaces, as may be displayed on a larger computer monitor, is more challenging when attempted on the relatively smaller screens of such devices. Further, the input mechanisms (e.g., keypads) of such smaller devices also present practical hurdles to the user input of parameter values to an application.

SUMMARY OF THE INVENTION

A system to modify digital data includes an interface to receive selection input, the selection input to enable selection of the digital data. A detector detects a characteristic of the digital data. The system further includes a data modification component operable to modify the digital data. A configurator automatically configures a function, of the data modification component, to modify the digital data. The automatic configuration of the function is based on the detected characteristic of the digital data.

According to a further aspect, there is provided a system including an interface to detect user-identification of a location with respect to a digital image. A detector is to detect a characteristic of the digital image at or adjacent the user-identified location. A configurator is to select at least one parameter of an image modification function, the selection of the at least a first parameter being performed utilizing the detected characteristic. The interface is further to cause display of a parameter input mechanism to receive a parameter value for the first parameter. Other features of the present invention will be apparent from the accompanying drawings and from the detailed description that follows.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Embodiments of the present invention is illustrated by way of example and not limitation in the figures of the accompanying drawings, in which like references indicate similar elements and in which.

DETAILED DESCRIPTION

Figure 1:
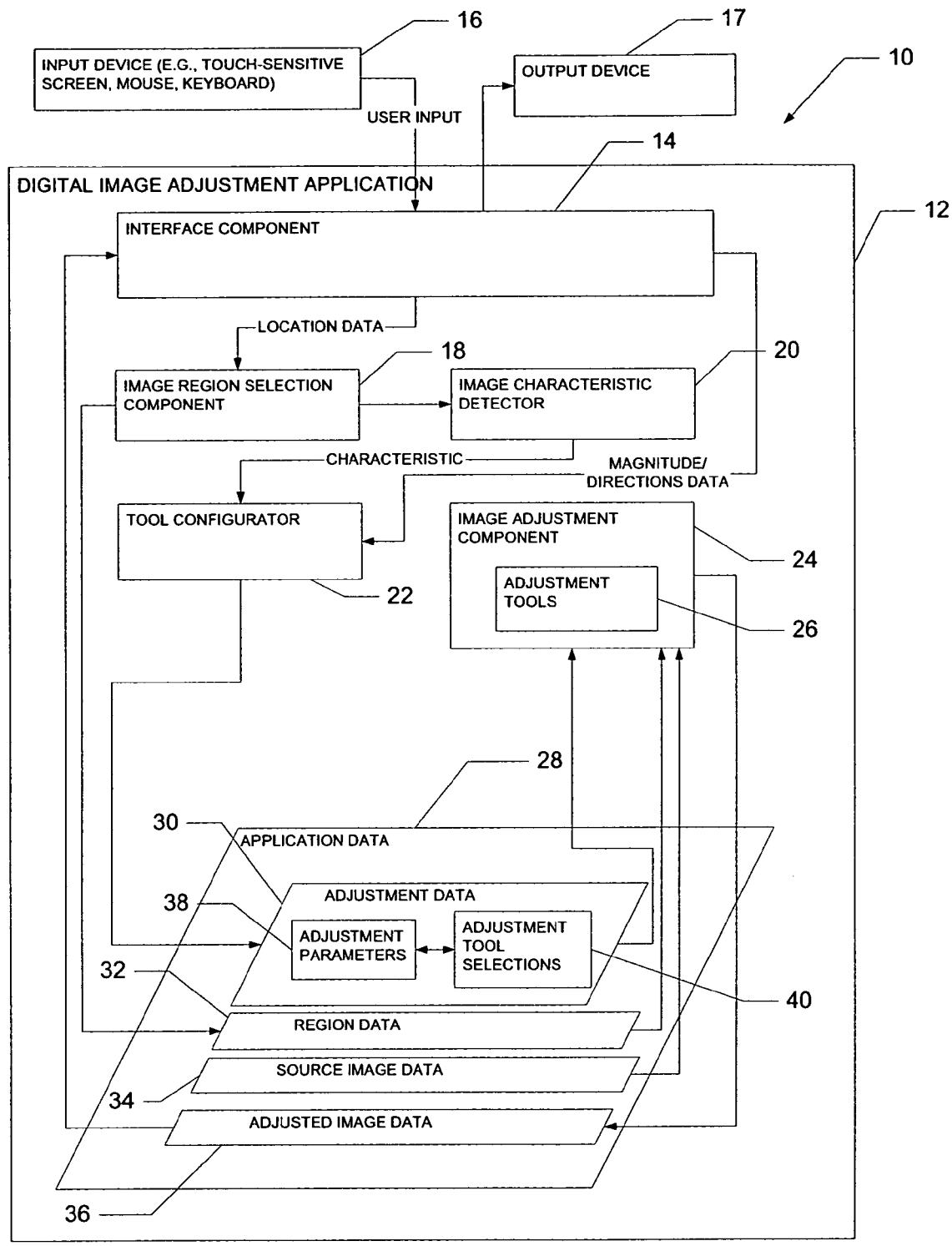
FIG. 1 is a block diagram illustrating architecture for a digital data adjustment application, according to an exemplary embodiment of the present invention.

A method and system to modify digital data are described. In the following description, for purposes of explanation, numerous specific details are set forth in order to provide a thorough understanding of the present invention. It will be evident, however, to one skilled in the art that the present invention may be practiced without these specific details.

An exemplary embodiment of the present invention seeks to provide a system and method to enable a user to modify source digital data (e.g., digital image data, such as vector-based or non-vector based graphics or art).

A method and a system are described below, as exemplary embodiments of the present invention, to modify or correct problems in digital images utilizing a set of functions (e.g., tools or brushes) provided by a digital image adjustment application. The set of functions change their behavior depending upon, inter alia, local image context. For example, a certain function may lighten shadows responsive to user-identification of a shadow region, and may likewise darken highlights responsive to user-identification of a highlight region in a digital image. Contextual information for an identified location (or portion) of a digital image may be the detected and analyzed in assessing which modification to perform with respect to a digital image. For example, a selected region in "shadow" is identified as being such relative to other regions, these other regions providing examples of contextual information pertaining to the selected region. Of course, it will be appreciated that the numerous types of contextual information could be utilized in determining a type of modification to be performed with respect to a selected region of a digital image.

In one embodiment, a "brush" may detect local image context, and modify its behavior accordingly. In another embodiment, a color correction tool may automatically correct redeye problems within a digital image, responsive to user-identification of a location in the digital image. Further functions may also, for example, set highlight, shadow or midtone neutral color points when placed on a closed-to-neutral bright, dark or medium luminous pixel.

Digital image adjustment applications may provide powerful functions to allow for the adjustment and correction of digital images. Specifically, shadow/highlight adjustments may be used to brighten up regions of digital images that are in shadow, or to darken highlights in lighter parts of an image. Typically, a user can independently control the amount of brightening of shadows, or the amount of darkening of highlights, by adjusting sliders for each of these parameters. Such adjustments are typically applied globally throughout the image or, if a selection mask is defined, throughout a selected portion or region of the image. Functions for brightening and darkening images may also indiscriminately increase or decrease brightness within a "brush profile", without distinction between shadows and highlights. These functions require a lot of user care, and fine brush control, in order to brighten up an object in shadow without affecting nearby non-shadow areas of an image. Certain other functions may sense underlying image color and erase or paint by an amount that is dependent upon the color. The basic behavior of such tools typically remains constant.

Image correction functions and methods may also require a user to decide which aspect of an image needs correction, to choose an appropriate image adjustment function, to choose appropriate image adjustment parameter settings, and to observe the corrected resulted image for possible readjustment.

An embodiment of the present invention seeks to simplify choosing an image adjustment method or function, by automatically configuring a function (e.g., selecting a function and providing appropriate configuration parameters for that function) based on image data identified by a user.

Portable computing devices, such as cellular phones and Personal Digital Assistants (PDAs) are good examples of small devices for which a simplified input to applications can be desirable, even though the operations that are performed responsive to those inputs may be particularly complex. One embodiment of the present invention enables users conveniently to adjust digital images stored on such devices by providing a simple user interaction scheme. For example, where a portable computing has a touch-sensitive screen, user interaction may be as simple as deciding whether to make an image adjustment (e.g., to make a lighting or color correction) and so indicate by depressing an appropriate button and to identify a part of the image that needs correction, for example via the touch-sensitive screen.

The exemplary systems and methods discussed below seek to combine the sensing of image content with behavior modification of a function to be applied to, for example, adjust a digital image. A "shadow/highlight" pointer tool, as an example of a function, enables a user to identify (e.g., by pointing) any location on a digital image displayed by a computing device. If the region at or adjacent to the user-identified location is in shadow, then shadows may be automatically lightened across the whole image. Further, the user may "drag" a cursor, the application may measure the distance dragged (e.g., displaced) and convert this measure into a modification value for the correction. In further embodiments, dragging to the upper left, for example, may increase the amount of correction, while dragging to the lower right may decrease the amount of correction, for a one-dimensional parameter input. Similarly, if a user-identified region is in highlight, then highlights may be darkened across the image. If a midtone region is identified, then a midtone contrast adjustment may be applied to the image as a whole.

An exemplary "shadow/highlight" function may have similar behavior, but operate only within a finite brush extent, and may further have an associated strength parameter. This provides, in the exemplary embodiment, for localized image modification. For example, the localized brush extent may be combined with an image segmentation operation to obtain local modification of the image within object boundaries only. In this example, the object size may also be used to adjust the amount of correction.

More sophisticated analysis of the digital image under the brush extent may be used to perform feature or object recognition, and to tailor the brush effect accordingly. An example is a brush that is sensitive to skin tones. When a brush stroke is placed over a skin tone, the brush stroke may adjust the chrominance values to improve the colors. In alternative embodiments, the brush may automatically perform noise reduction or blur an image to remove wrinkles. In further embodiments in which eye detection is incorporated, a function (e.g., a redeye "brush") may remove redeye when placed near a red pupil, or may also be used to change iris color when placed over an iris. In yet a further embodiment, the brush may identify a tree, as a feature within a digital image, and automatically tailor the brush effect to adjust the colors of the tree in a predetermined manner, or to present one or more parameters that are most useful or appropriate for modify colors of a tree. The brush stroke placed over a sky portion of a digital image may, in one embodiment, also be recognized, and the brush automatically tailored to perform adjustments appropriate to a "sky portion" of a digital image (e.g., to modify the "blueness" of the sky as represented in the digital image).

In summary, an embodiment of the present invention provides for the adaptive behavior of an image modification function, based on a real-time analysis of a target area of a digital image that may be user-identified (e.g., by moving a virtual "brush" over an image area or region to provide the user-identification thereof).

FIG. 1 is a block diagram illustrating a system 10, according to an exemplary embodiment of the present invention, to modify digital data (e.g., digital image data). The system 10 includes a digital image adjustment application 12 that resides and executes on a computer system (not shown). The computer system may be a personal computer, a server computer, a portable computing device, a cellular telephone, a smart phone or a PDA, for example.

The digital image adjustment application 12 in turn includes an interface component 14 via which the application 12 receives input from, and provides output to, other applications executing on the computer system, and/or devices forming part of, or being communicatively coupled to, the computer system. For example, the interface component 14 is shown to receive user input from an input device 16 (e.g., a touch sensitive screen, mouse, keyboard, etc.), and to provide output to an output device 17 (e.g., a screen, audio output device, video output device, etc.). Included in the user input that may be received at the interface component 14 from the input device 16 is location data, which identifies a user-identified location within a digital image that may be presented via the output device 17 (e.g., a screen) to a user.

The application 12 further includes a selector, in the exemplary form of an image region selection component 18, which operates, in one embodiment, to select a region of a digital image using a user-identified location within the digital image. The selected region may be utilized for analysis and/or a modification. To this end, the image region selection component 18 may deploy any one of a number of algorithms (e.g., geometric, color-based or edge-based algorithms) to select a region (or portion) of a digital image for analysis and/or a modification based on an identified location.

In one embodiment, the image region selection component 18 may generate one or more selection masks according to which activities (e.g., modifications, analysis etc.) with respect to a digital image will be localized or limited.

The digital image adjustment application 12 further includes an image characteristic detector 20 which, in one exemplary embodiment, employs algorithms to detect a characteristic of a digital image as a whole, or of a region (or portion) of the digital image identified by the image region selection component 18. The detector 20 may accordingly employ any number of algorithms to analyze image data underlying a digital image, and to detect a characteristic thereof. For example, the detector 20 may detect that a certain region of a digital image is in a shadow or in highlight, that a particular contrast exists between two regions within a digital image, that "redeye" is present in a selected region, or that the skin tone in a particular region of an image deviates from an expected range of skin tones. Further details regarding exemplary algorithms that may be deployed as part of the image characteristic detector 20 are discussed below.

A tool configurator 22, in one embodiment, operates to configure one or more functions, in an exemplary form of adjustment tools 26, of a data modification component, in an exemplary form of an image adjustment component 24. The adjustment tools 26 may be employed (either manually or automatically) within the context of the digital image adjustment application 12 to modify digital data. Further, the tool configurator 22 may operate to configure (e.g., select or provide parameter values for) adjustment tools 26 automatically (e.g., based on a detected characteristic of a digital image), manually (e.g., responsive to user input identifying a particular function to be performed by the application 12) or utilizing some manual input, but also performing a certain degree of automated configuration (e.g., where a user identifies a function, but the configurator automatically provides parameter values for the user-identified function).

The tool configurator 22 configures the adjustment tools 26 by generating and storing adjustment data 30, as part of the application data 28 for the digital image adjustment application 12. The adjustment data 30 in turn may include adjustment tool selection data 40, which specifies which adjustment tools 26 should be utilized to achieve a specific result or function. The adjustment data 30 may also include adjustment parameter data 38 according to which the selected adjustment tools 26 may be configured. For example, adjustment parameters may specify the extent to which a particular tool operates to adjust digital image data. The adjustment data 30 is accordingly shown to constitute output of the tool configurator 22, and input to the image adjustment component 24.

The application data 28 further includes region data 32, generated by the image region selection component 18. The region data 32 may, in one embodiment, constitute a mask, and also provides input to the image adjustment component 24 so as to localize the effect of adjustment operations performed by the adjustment tools 26.

The application data 28 furthermore includes source image data 34, which may be received into the application 12 from a local storage associated with the computer system, or may be received directly from some other input device, such as a digital camera or the like. The source image data 34 is also shown to provide input to the image adjustment component 24, so as to allow the adjustment tools 26 to perform adjustment operations to the source image data 34, and to output adjusted image data 36. The adjusted image data 36 is provided to the interface component 14, for output to an output device 17 (e.g., a screen) and eventual display to a user.

Finally, the interface component 14, in one embodiment, is also shown to provide magnitude/direction data to the tool configurator 22, this magnitude/direction data having been received via the input device 16. The interface component 14, as will be described in further detail below, may display an overlaid (or superimposed) coordinate system (e.g., represented by a scaled axis) on an image to be modified, and allow a user to identify at least one further location, in addition to an initially identified location, . The further location may be used, in conjunction with coordinate system, to generate a parameter value potentially indicating magnitude and/or direction of a modification to be performed by an adjustment tool 26. Accordingly, the tool configurator 22 may utilize the magnitude/direction data to generate an appropriate adjustment value according to which one or more selected adjustment tools 26 may be configured.

Figure 2:
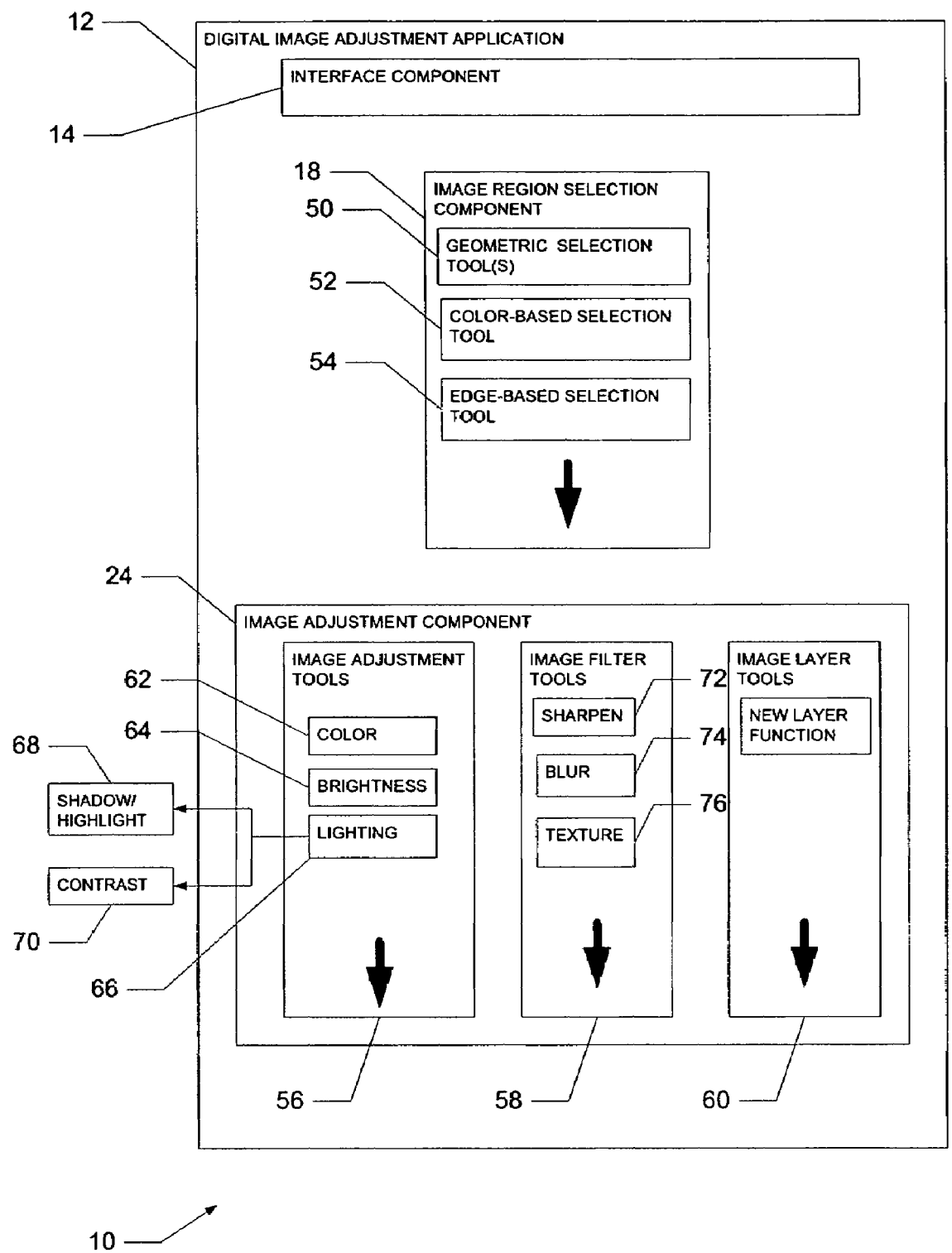
FIG. 2 is a block diagram illustrating further architectural details regarding an image region selection component, and an image adjustment component of the digital data adjustment application, according to an exemplary embodiment of the present invention.

FIG. 2 is a block diagram illustrating further architectural details regarding the digital image adjustment application 12, and specifically the image region selection component 18 and the image adjustment component 24. Turning first to the image region selection component 18, region selection tools included in this component 18 may, in one embodiment, be broadly classified as being geometric selection tools 50, color-based selection tools 52 and edge-based selection tools 54. As discussed above, the various functions (e.g., tools) of the component 18 may operate automatically to select a region (or portion) of a digital image with respect to which the digital image adjustment application 12 will perform an operation or activity. Such an operation or activity may be an analysis operation, or a modification or adjustment activity. The geometric selection tools 50 operate, at a high level, to identify regions of an image based on geometric shapes that may be identifiable within a digital image. Color-based selection tools 52 operate to identify regions within a digital image based on the continuity (or discontinuity) of colors within an image. Similarly, the edge-based selection tools 54 operate to detect definite edges that may be present within image data. Turning now to the image adjustment component 24, this is shown to include a number of functions that contribute towards the modification of digital image data. In one embodiment, these functions are conveniently labeled as "tools", and include image adjustment tools 56, image filter tools 58 and image layer tools 60. Examples of the image adjustment tools 56 include color adjustment tools 62 (e.g., the "color fixed" tool discussed in further detail below), brightness tools 64, and lighting tools 66 (e.g., the "lighting fix" tool and the "contrast fix" tool discussed below). In one embodiment, the lighting tools 66 may be broadly classified as shadows/highlight correction tools 68 and contrast correction tools 70. The image filter tools 58 may include, for example, a sharpen filter tool 72, which operates to sharpen images that may be experiencing a blurring, a blur filter tool 74, which may operate to blur an image, and one or more texture filter tools 76, which may add one or more texture effects to an image. Image layer tools 60, in one embodiment, allow for the definition of "image layers" within which activities (e.g., adjustments or analysis) may be performed with respect to source image data 44. In one embodiment, the image layer tools 60 may facilitate the creation of a number of layers, each of which has one or more activities associated therewith. Each of these image layers may then be selectively overlaid on a source image to thereby modify the source image. Each image layer may furthermore include one or more selection masks so as to enable localization of activities that are associated with the respective layer.

Figure 3:
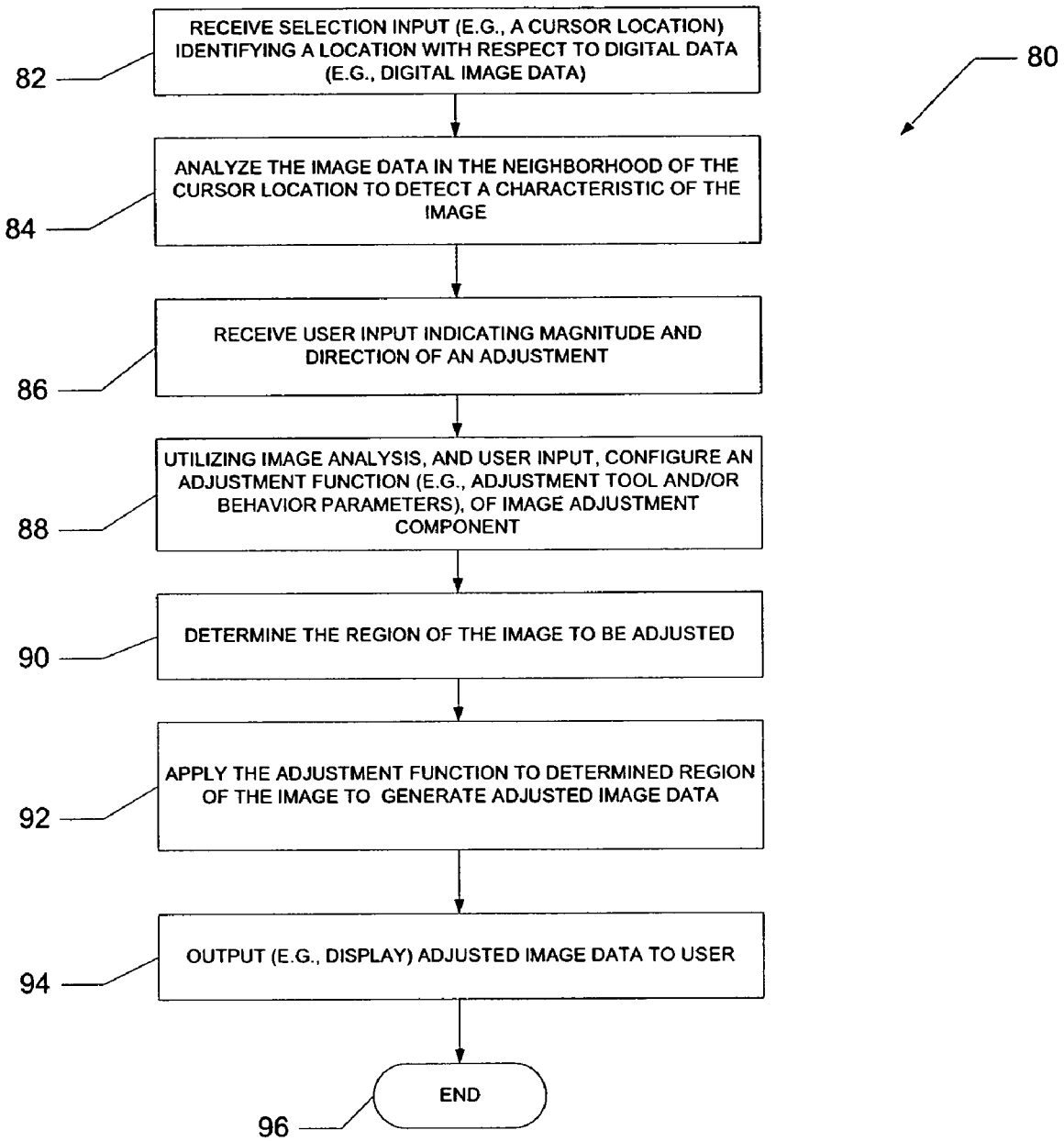
FIG. 3 is a flowchart illustrating a method, according to an exemplary embodiment of the present invention, to modify digital data.

FIG. 3 is a flowchart illustrating a method 80, according to an exemplary embodiment of the present invention, to modify digital data, in the exemplary form of digital image data. While the method 80 is described below as being performed by the components of the digital image adjustment application 12, which is a software application, it will be appreciated that, in other embodiments, operations may be performed by software, firmware, hardware or various combinations and permutations of the aforementioned.

The method 80 commences at block 82 with the receipt, by the interface component 14, of a user input identifying a user-indicated (or user-identified) location with respect to source image data 34. Spatial coordinates identifying the user-identified location may be determined, for example, by the interface component 14, utilizing a coordinate system superimposed on the display the source image, and included in the user input that is received by the interface component 14. The user input may be provided to the interface component 14 by any one of a number of sources, depending on the device. For example, where the digital image adjustment application 12 is executing on a personal computer, the source image may be displayed on a screen coupled to the computer (e.g., a liquid crystal display (LCD) screen), and the user-identification of the location may be performed by the user locating a cursor, utilizing a mouse, over the relevant location on the source image, and performing a click operation. Alternatively, where the device on which the application 12 is executing is a personal digital assistant (PDA) with a touch-sensitive screen, the user input may be provided by the user tapping on a location on the touch-sensitive screen and on which the source image is being displayed. It should be noted that the below described operations may, in one embodiment, be automatically performed responsive to the receipt of the user input at block 82. In further embodiments, certain of the operations described below may require manual input or activation to proceed.

The user input may also identify a type of modification to be performed by the digital adjustment application 12. For example, and as is more fully described below, a single tap on a touch sensitive screen may invoke a fully automatic modification with respect to a digital image, whereas a double tap on the touch sensitive screen may invoke a specific type of modification, or may localize modification to a specific a region of the digital image.

The method 80 then proceeds to block 84, where the digital image adjustment application 12 proceeds to analyze the source image data 34, potentially in the neighborhood of the user-identified location, to detect one or more characteristics of the source image. To this end, in one embodiment, location data, identifying a user-identified location within the source image data 34, is communicated from the interface component 14 to the image region selection component 18, as illustrated in FIG. 1. The image region selection component 18 may then utilize any one or more of the tools, discussed above with reference to Reference 2, to identify a "neighborhood" (e.g., a region or portion) of the source image to which the characteristic analysis should be localized. The choice of tools that may be employed by the image region selection component 18 is, in one embodiment, automatic, and may be determined by settings stored by the application 12. In a further embodiment, the choice of tools deployed by the image region selection component 18 may be automatically determined responsive to information received from the image characteristic detector 20. For example, the image characteristic detector 20 may determine that an area in the immediate vicinity of the user-identified location exhibits a predetermined characteristic (e.g., is in shadow), and communicate information to the image region selection component 18 identifying this characteristic. Based on this information, the image region selection component 18 then automatically selects one or more tools 50, 52 or 54 to identify a region of the source image to which the characteristic protection may be limited.

As a further operation at block 84, the image characteristic detector 20 is deployed to detect one or more characteristics of the source image within the neighborhood of user-identified location. As noted above, the "neighborhood" that is analyzed by the image characteristic detector 20 may be localized by a mask defined by the image region selection component 18. Examples of characteristics that may be detected by the image characteristic detector 20 are provided below and include, for example, highlight, shadow, contrast, and color (e.g., redeye or skin tone) problems.

In one embodiment, the image characteristic detector 20 may, as is fully described below, also determine the "neighborhood luminance" for a user-identified location with respect to a digital image. For example, luminance may be taken as a measure of pixel intensity (e.g., a L parameter in the Lab color space). In a further embodiment, the image characteristic detector 20 may detect the chrominance at or adjacent a user-identified location, chrominance being a measure of pixel "colorfulness" (e.g., a and b parameters into the Lab color space).

Of course in other embodiments, the image characteristic detector 20 may operate to detect any one or more characteristics of an image such as, for example, characteristics that indicate a potential problem or undesirable feature of the source image.

In one embodiment of the present invention, the image characteristic detector 20 may include ambiguity resolution logic to resolve ambiguities regarding a detected characteristic of the digital image. For example, where the selection input received at block 82 identifies a location on the border of a first image portion that is in shadow, and a second image portion that is highlighted, ambiguity may arise as to whether the user intended selection of the first or second image portion. The user may of course provide any number of inputs that result in an ambiguity, for example where the selection input at block 82 identifies a border or transition region between two image features, or identifies a region within which multiple characteristics are discernible by the image characteristic detector 20.

In situations in which ambiguity arises regarding which portion of a digital image is to be analyzed at block 84, or where multiple characteristics are detected, the ambiguity resolution logic operates to a resolve such ambiguities. In one embodiment, and the ambiguity resolution logic may prompt a user (e.g., by way of a menu or other graphical prompt) to identify an image portion to the analyzed, or to identify a characteristic (e.g. shadow, redeye) to be corrected.

Further, where multiple characteristics are detected, the ambiguity resolution logic may present one or more recommendations to the user regarding corrections to be made to the digital image. Consider the example in which a user provides input at block 82 identifying the face of a person has represented in a digital image. The analysis performed at block 84 may detect two characteristics pertaining to the face which could potentially benefit from an image correction, namely the skin tone may be suboptimal, and "redeye" may be present within the eyes of the face. In this case, the ambiguity resolution logic may present the user with an option menu of recommended image adjustments (e.g., skin tone adjustment and redeye reduction) that may be performed by the image adjustment component to optimize or improve the digital image.

In another embodiment, the ambiguity resolution logic may calculate and attribute confidence factors to each of the detector characteristics, or image portions. For example, where multiple characteristics are detected, the ambiguity resolution logic may determine to what extent each of the characteristics is present within the analyzed image data, and attribute confidence factors accordingly. The ambiguity resolution logic may calculate an "average value" for each characteristic in question with respect to the digital image as a whole, and then determine the extent to which each of a number of characteristics values, specific to a portion of the digital image, deviates from an average value for the characteristic. In this way, the ambiguity resolution logic may determine the extent to which each of a number of multiple characteristics is present in a particular portion of the image, relative to the image as a whole, or at least relative to a larger portion of the digital image.

Further, certain characteristics may be given preference over other characteristics as a default. For example, redeye problems detected in an image may be automatically, and as a default, given preference by the ambiguity resolution logic over shadow problems also detected in the image.

In another embodiment, the ambiguity resolution logic may maintain historical information regarding modifications or corrections that have previously been selected by a particular user, and again attribute confidence factors accordingly.

Where there is ambiguity in regarding which portion or region of a digital image a user intended to select for modification, the ambiguity resolution logic may determine the extent to which each of a number of characteristics is present in each of the portions of the digital image, and select a portion accordingly. For example, where the extent of shadow present in a first portion is greater than the extent to which highlight is present in a second portion, the ambiguity resolution logic may select the first portion of the digital image, based on the greater extent of the shadow present therein. Determining the extent to which each of a number of characteristics is present in each of a number of portions of the digital image may involve calculating an average for the characteristic across the image as a whole, and utilizing that average as a reference value.

The selection of a region may also include determine which of a number of characteristics is present in each of the portions, and making a selection based on this determination. For example, where a redeye problem is detected in a first portion of an image, and a shadow problem is detected in a second portion of image, the redeye problem may be regarded as taking precedence over a shadow problem, and the first portion of image may be thus selected.

At block 86, the interface component 14 may receive further user input indicating the magnitude and/or direction of an adjustment or modification to be made to the source image. This further user input may be received by detecting a "drag" operation with respect to a coordinate system (e.g., represented by a scaled axis) that is superimposed, or overlaid, within a user interface over the source image. Further details regarding parameter input in this manner are described below with reference to FIGS. 4 and 5. In another embodiment, the user input may be received by detecting user-identification of a further location with respect to the digital image. For example, the user may identify a second location by a "tap" or "click" with respect to a digital image. The distance between the first and second user-identified locations with respect to the digital image may be interpreted, by the interface component 14, as a magnitude value. The modification operation may be performed utilizing such a magnitude value as input. Further, a direction derived from the location of the second user-identified location relative to the first user-identified location may be interpreted by the interface component 14 as a direction input or a value.

At block 88, the tool configurator 22 uses the user input received at blocks 82 and 86, and also one or more characteristics of the image detected at block 84, to configure an adjustment function of the image adjustment component 24. The detected characteristics of the image may include, for example, detection of a specific feature (e.g., a face, the sky, a tree, skin etc.) represented within the digital image. The detected characteristics of the image may also include, for example, contextual information with respect to a selected location, or portion, of the digital image. For example, where the user selects a particular feature (e.g., a face) represented within a digital image, contextual information may indicate that the face is in shadow relative to other portions of the digital image. In other words, information regarding the context of a selected feature within the digital image may be determined and examined as part of the process of determining the characteristics of the digital image. The characteristic detection may also include detecting a problem (e.g., excessive highlight, excessive shadow) present in the digital image, either at or adjacent a selected portion or location on the digital image, or within the digital image as a whole.

The configuration of the adjustment function, in one embodiment, includes a selection of one or more data modification mechanisms (e.g., the adjustment tools 26) and the specification of parameters for such data modification mechanisms. The selection by the tool configurator 22 of adjustment tools 26 may be reflected in the adjustment tool selection data 40, which is stored as part of the application data 28, by the tool configurator 22. Similarly, the parameters under which the selected adjustment tools 26 are to operate to achieve the function may be reflected in the adjustment parameter data 38 that is similarly stored as part of the application data 28.

As such, the tool configurator 22 operates automatically to configure a function of the image adjustment component 24, based, at least partially, on a detected characteristic of the source image data 34. This configuration may include the selection and/or configuration of the behavior of at least one data modification mechanism (e.g., an adjustment tool 26) based on the detected characteristic. Further, the tool configurator 22 may select at least one or more parameters of a selected adjustment tool 26, to be configured based on the detected characteristic. The selection of an adjustment tool 26 may be based not only on the detected characteristic of the digital data, but also upon the user input received at block 82 or 86.

In a further embodiment of the present invention, the configuration (e.g., the selection and parameter input) of a function of image adjustment component 24 may also utilize information indicative of an intention of the user. For example, the user may, prior to commencing the method 80, have placed a device or computer system performing the method 80 in a "redeye correction" mode. In this way, the user may have provided information from which an intention of the user is discernible. In another embodiment, prior to commencing the method 80, the user may be prompted (e.g., by way of a pop-up menu or other visual or your prompt) to identify a type of correction that the user would like to be corrected. The intention of the user may also be a derived, prior to commencing the method 80, from any one of a number of other observed behaviors or imported parameters.

At block 90, the image adjustment component 24 determines a region of the source image to be adjusted, based on input received from the image region selection component 18. The region of the image to which the adjustment is to be applied may overlap with the region on which the image characteristic detector 20 performed its analysis. Alternatively, the region to be adjusted may be more localized (e.g., to the pupil area of a "redeye" image problem).

At block 92, the image adjustment component 24 modifies the source image data 34, utilizing one or more adjustment tools 26, as identified by the adjustment tool selection data 40 and as configured utilizing the adjustment parameter data 38, to generate the adjusted image data 36. To this end, the image adjustment component 24 may read the adjustment data 30 as part of the automatic configuration operation, and generate the adjusted image data 36. The adjusted image data 36, as shown in FIG. 1, is written to the application data 28, from where it is accessible by the interface component 14 for output to an output device 17. For example, the adjusted image data 36 may be outputted to a screen for presentation to a computing device for display to a user at block 94.

The method 80 then concludes at termination block 96. Of course, a user may subsequent to the operations described above, identify a further location with respect to a digital image, in which case the method 80 will then again loop through the operations described above as having been performed at blocks 82-96.

Figure 4:
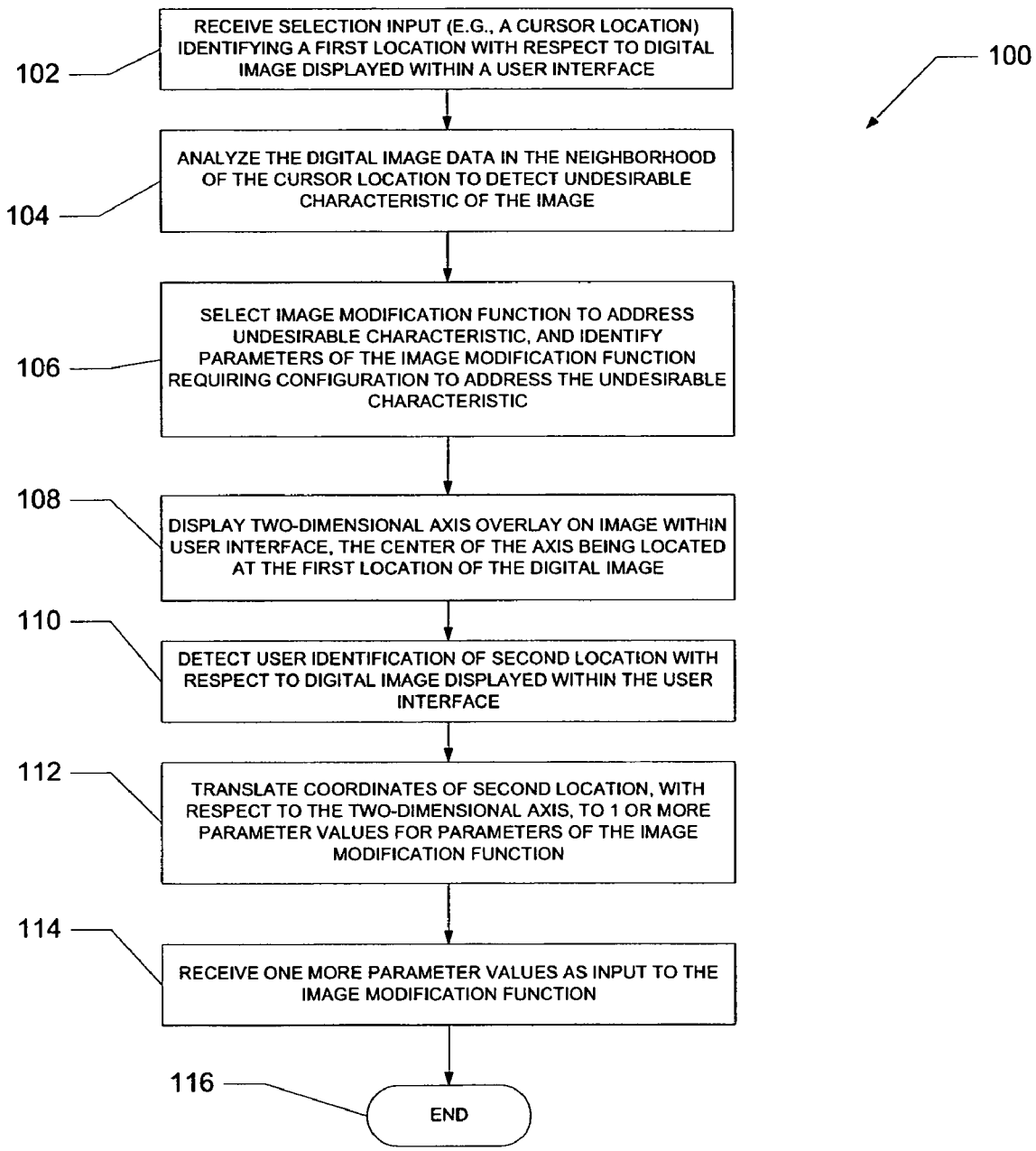
FIG. 4 is a flowchart illustrating a method, according to an exemplary embodiment of the present invention, to facilitate input of parameter values for a digital image modification function.

FIG. 4 is a flow chart illustrating a method 100, according to an exemplary embodiment of the present invention, to facilitate the input of a parameter value, to an application for a digital image modification function. As discussed above, menus that are typically displayed by digital image adjustment applications may not be intuitive to inexperienced users, and also may be impractical to display on smaller screens, such as those of portable computing devices. Accordingly, the method 100 is an exemplary method to facilitate the convenient input of a parameter value for an image modification function, such as those of the image adjustment component 24 discussed above.

The method 100 commences at block 102 with the receipt of input, via the interface component 14, at a digital image adjustment application 12. The input may specify a first user-identified location with respect to a digital image. User-identification of the first location may occur via a "tap" on a touch-sensitive screen, or by locating a cursor over the first location and performing an "click" utilizing a mouse, for example.

At block 104, the image adjustment component 24 proceeds to analyze the source image data 34 in the neighborhood of the first location to detect a characteristic of the image in the neighborhood. Specifically, the source digital image may be analyzed to detect an undesirable characteristic (e.g., excessive shadow, excessive highlight, redeye, etc.) in the image neighborhood at or proximate to the first location.

At block 106, the tool configurator 22, utilizing input from the image characteristic detector 20, selects an image modification function of the image adjustment component 24 to address the identified undesirable characteristic. This selection of an image modification function may, in one embodiment, be represented in the adjustment tool selection data 40. Further, the tool configurator 22, at block 104, may identify one or more parameters of the image modification function that require configuration to address the undesirable characteristic. For example, where a region of the image at or adjacent the first location exhibits excessive highlight, the shadow/highlight and contrast tools 68 and 70 mentioned above with reference to FIG. 2 may be selected and appropriate parameters for each of these tools may be identified as requiring configuration (e.g., having a specific parameter value assigned thereto) to address the undesirable characteristic.

At block 108, the interface component 14 proceeds to display a parameter input mechanism, within a user interface, to receive a parameter value, or values, for the at least one of the parameters identified as requiring configuration in block 106. The parameter input mechanism displayed includes a coordinate system that is overlaid on the source image, so as to enable the mapping of locations within the user interface (and accordingly with respect to the source image) to the parameter values of the selected parameter.

The interface component 14 according allows mapping of both the first user-identified location, as well as any further user-identified locations, to corresponding parameter values for the identified parameter of the selected image modification function.

The coordinate system includes at least a one-dimensional axis, which is displayed in a superimposed or overlaid manner with respect to the source image on a screen. The one-dimensional axis may accordingly operate to map locations, within a user interface displayed on the screen, to parameter values for at least one parameter.

In a further embodiment, and as shown in block 108, the coordinate system may be represented by a two-dimensional axis in order to map locations within the user interface to parameter values for both first and second parameters of a selected image modification function. Regardless of whether a one or a two-dimensional axis is displayed or overlaid on an image of block 108, a reference point for the axis (e.g., the center or zero value of the axis) may be the first user-identified location of the source image, as identified at block 102.

Figure 5:
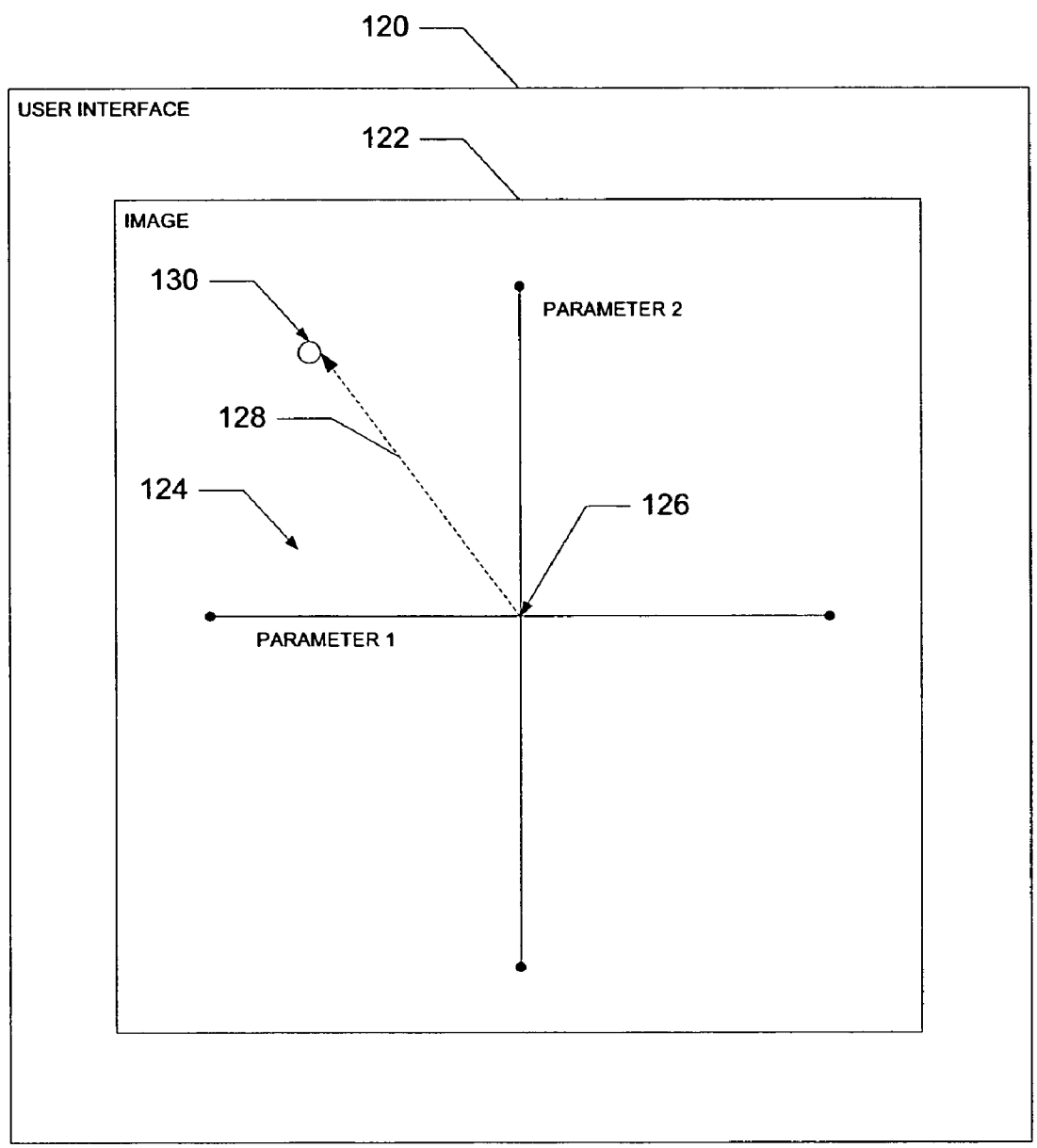
FIG. 5 is a user interface diagram, illustrating a parameter input mechanism, according to an exemplary embodiment of the present invention, which may be displayed in an overlaid manner with respect to a digital image in order to facilitate the input of a parameter value for an image modification function.

FIG. 5 is a user interface diagram, according to an exemplary embodiment of the present invention, displaying a user interface 120 within which is displayed a source image 122 on which a two-dimensional axis 124 has been superimposed or overlaid. As will be noted, the center point 126 of the axis 124 is shown to be located at a first user-identified location. Each of the axes of the two-dimensional axis is furthermore shown to correspond to a respective parameter. The parameters of the first and second axes may each be parameters for a common image modification function, or may each be associated with separate and distinct image modification functions. FIGS. 7-11 provide further examples of axes, both one and two-dimensional, that are overlaid on images in order to facilitate the user input of parameter values for respective parameters of image modification functions.

The display of information identifying parameters of an image modification function, as shown in FIG. 5, may also serve to advise a user regarding which image modification function has been selected by the tool configurator 22. Specifically, the display of parameter names by the interface component 14 reflects the function of the image adjustment component 24 selected by the tool configurator 22.

Returning to FIG. 4, following display of the parameter input mechanism, in the exemplary form of a two-dimensional axis, overlaid on the image and centered with respect to the first user-identified location, at block 110, the interface component 14 detects the user-identification of a second location with respect to the digital image 122 displayed with the user interface 120. FIG. 5 shows a second location 130 as being identified by the user, again by either for example "tapping" on a touch sensitive screen user interface or by locating a cursor and performing a "click" at the second location 130. The second location 130 may be detected by a discreet selection operation performed at the second location 130, or may in a further embodiment be detected by a "dragging" operation performed, for example utilizing a cursor, from the first location 126 to the second location 130, as indicated by a broken line 128.

In any event, at block 112, the interface component 14 proceeds to translate the coordinates of the second location 130, with respect to the two-dimensional axis 124, into one or more parameter values for parameters of the selected image modification function. For example, it will be appreciated that the coordinates of the second location 130 may be translated into values for both the first and second parameters associated with the respective axes of the two-dimensional axis 124.

At block 114, one or more parameter values are then communicated from the interface component 14 to the tool configurator 22 which proceeds to store these values as adjustment parameter data 38 within the application data 28. As described above with reference to FIG. 3, the adjustment parameter data 38 then provides input to the image adjustment component 24 to configure an image modification function supported by the component 24.

The method 100 then terminates at end block 116.

Further details regarding exemplary embodiments of the technology components and methodologies discussed above will now be provided. One exemplary embodiment of the present invention allows a user to correct an image by simply pointing to "problem" areas in the image. More generally, an exemplary class of functions (e.g., tools and brushes) of an image adjustment application 12 is described below, these functions being capable of having their behavior automatically configured, depending upon the local image information at the point in the image (e.g., identified by cursor or finger point) at which the function is applied. Application of the function may be invoked, for example, by pressing a finger on a touch sensitive screen or by moving a cursor with a keyboard or mouse and clicking on a point in the image.

In one embodiment, multiple image adjustment functions, in the exemplary form of image adjustment tools 26, are provided. Each tool 26 has its own particular behavior set, which is the set of image operations it will apply depending upon how and where the user moves the tool 26 and upon the underlying image data. While exemplary tools 26 are described herein, it will be appreciated that there is great flexibility in choosing the set of tool behaviors.

A first exemplary tool, which will now be discussed with respect to FIGS. 6-12, is an example of a lighting tool 66 and may conveniently be termed a "lighting fix" tool. The lighting fix tool enables correction of various lighting problems, such as objects which are too dark or too light. Specifically, the exemplary lighting fix tool implements the following behaviors: Shadow/Highlight correction, Clipping Contrast changes, Brightness changes and Midtone Contrast changes. The combined context of the nature of the user input (e.g., single click, double click, click and drag) and the image region pointed to determine which of these behaviors is invoked.

A second exemplary tool, which will be discussed below, is an example of a color adjustment tool 62, and may conveniently be termed a "color fix" tool. The color fix tool enables correction of color problems, such as color casts and saturation problems. The color fix tool further implements Color Neutralization, Shadow, Midtone and Highlight Color Clipping and Color-Specific Color Saturation.

A third exemplary tool is a further example of a lighting tool 66, and may conveniently be termed a "contrast fix" tool. The contrast fix tool implements various contrast corrections including Midtone Contrast adjustments and Shadow and Highlight Clipping. These features may optionally be implemented as part of the lighting fix tool, as will be explained below.

Details regarding behaviors and methods to implement the above listed tools are provided below. Of course, many variations are possible.

Lighting Fix Tool

Figure 6:
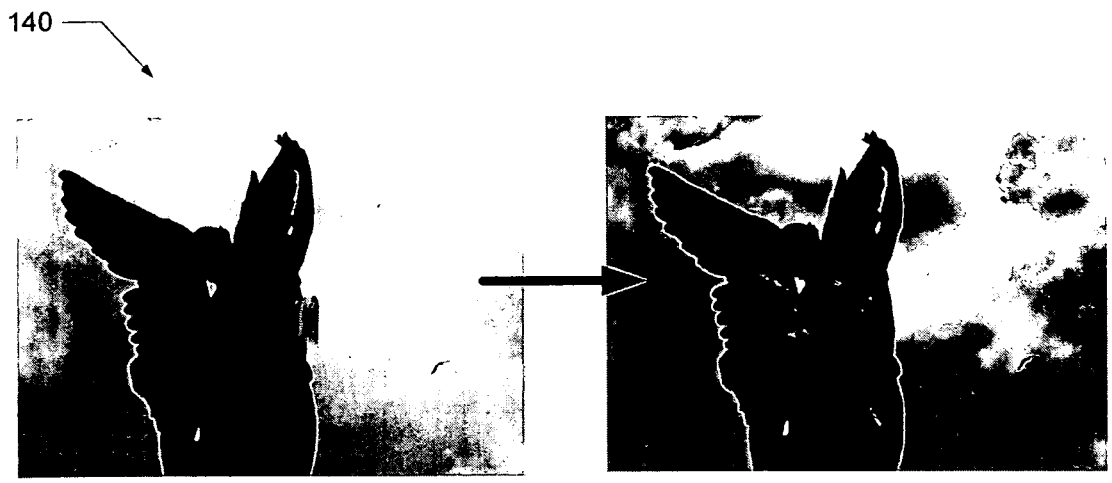
FIGS. 6-19 are screen shots illustrating modifications to digital images, according to various exemplary embodiments of the present invention.

FIG. 6 illustrates a pair of screenshots 140, illustrating the effects of a totally automatic lighting correction, which may be performed by the lighting fix tool. For example, by double-clicking anywhere on the image depicted in the first screenshot, the totally automatic lighting correction may be performed. In a further embodiment, should a user double-click in a shadowed area, the shadows are preferentially corrected.

Figure 7:
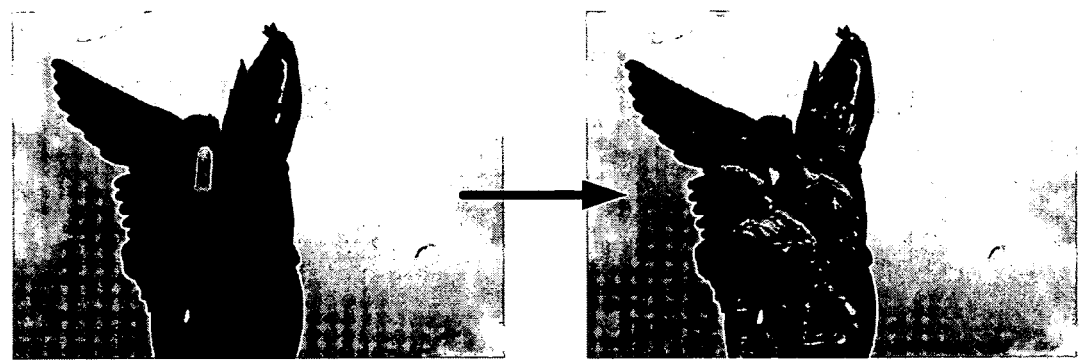

FIG. 7 illustrates a further pair of screenshots 142, illustrating a "tapping" operation performed on a shadowed region (the statute), responsive to which the lighting fix tool operates to improve the lighting with respect to the shadows (the statute) only. In one exemplary embodiment, the more a user taps on a shadowed region, the more the shadows in that region are lightened by the lighting fix tool.

Figure 8:
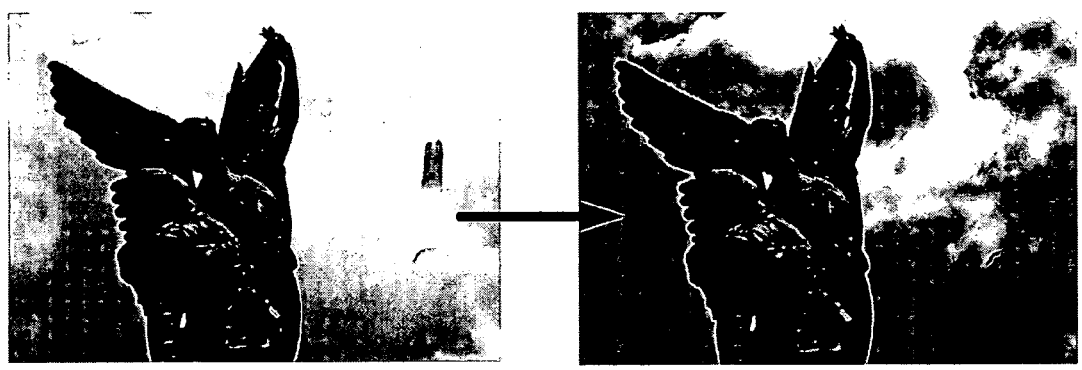

FIG. 8 illustrates yet a further pair of screenshots 144, illustrating a "tapping operation" performed with respect to a highlighted region (the clouds), responsive to which the lighting fix tool reduces the highlighting in the highlighted region (the clouds). Again, the more a user taps, in one embodiment, on a highlighted region, the more that region may be darkened. The behavior of the lighting fix tool, in one embodiment, is determined by analyzing the image data in the vicinity of the region selected (e.g., "pointed to") by a user. Let r0 designate the spatial coordinates (x and y for a two-dimensional image) of the center of the region that is pointed to by a user. For lighting correction, a segmented neighborhood luminance average, L0=L(r0), (see explanation below) determines the nature of the tonal region that is being identified. It is assumed to be normalized, so that its range of values is between 0 and 1. Tone membership functions, T(L), which depend upon this local luminance, may be defined as follows:

For Shadows, $TS(L)=\text{tone}(1-L, 0.5)$, and for Highlights, $TH(L)=\text{tone}(L, 0.5)$, where the function tone (L, shapeparameter) is defined as:

$\text{tone}(I, \text{shape})=x[1-f+fx(3-2x)]$, with $x=I'[1+f(\text{gain}-1)]$, and $f=(1-\text{shape})^2.5$.

The parameter "gain" is set to a value of 10, as a nominal suggested value. The above function has the property that when shape=0, it produces a steep function of I which is greatest at I=1 and decays quickly to zero for smaller values. When shape=1 the function is a straight line: tone (I, 1)=I. Thus, the shape parameter is a control over the shape of the function which enables a continuous range of shapes varying from steep and localized to broad and straight. The value of 0.5 provides an acceptable compromise steepness. For midtone regions, $TM(L)=1-TS(L)-TH(L)$, with the values being limited to the range 0 to 1. The tonal nature of the region identified may now be determined. In one implementation, the largest of the three values may be taken as indicative of the region of interest. In other words, the largest value from the below sets is taken as indicative:

{TS(L0), TM(L0), TH(L0)}.

If TS(L0) is largest, then a shadow region is identified. If TM(L0) is the largest, then a midtone region is identified. If TH(L0) is largest, then a highlight region is identified.

In one embodiment, a Shadow/Highlight tool 68 (e.g., implemented as an algorithm) produces an adjusted image I' from an original (or source) image I. The amount of correction is determined by two correction parameters, namely a Shadow Amount, aS, and a Highlight Amount, aH:

$I'=FSH(I, aS, aH)$.

The above function provides some measure of image correction in different portions of the image. If aS is zero, then the highlight regions are primarily affected. If aH is zero, then the shadows are primarily affected.

Automatic Parameter Input

Specific examples of automatic parameter input, by a user, will now be discussed. If the users either presents a single or double click (or tap) on the image, automatic correction is performed, according to an exemplary embodiment of the present invention. For the case of a single click or tap, if a shadow region is identified, then aH is set to 0, and the following function is applied to a source image as a whole, thus producing a shadow-corrected image:

$I'=FSH(I, a, 0)$.

Likewise if a highlight region is identified, then aS is set to zero, and the following function is applied to the source image as a whole:

$I'=FSH(I, 0, a)$.

Another exemplary implementation sets these two amounts according to the two tonal amounts:

$I'=FSH(I, a\, TS(L0), a\, TH(L0))$.

In this exemplary implementation, should a user point to lighter portions of the shadows, limited corrections to the highlights will be performed in addition to the shadow corrections.

In either variation, the parameter, a, determines the total amount of correction. Values for this parameter can be determined in various ways. One approach uses a method for automatically calculating the two amount parameters, aS and aH, by analyzing the distribution of luminance values in the image. The net result is an automatic determination of aS and aH. These automatic suggested values may be designated as aS0 and aH0 respectively. If the user issues a single click or a single tap, in the case of a touch-sensitive screen, then the automatic amount value for the region chosen may be used.

To summarize this case:

User taps at location r0 in image I.

Determine neighborhood luminance L0 (to be described below).

Determine tool behavior: If Ts(L0) is largest, then correct shadows:

$I'=FSH(I, aS0, 0)$.

On the other hand, if TH(L0) is largest, then correct highlights:

$I'=FSH(I, 0, aH0)$.

If TM(L0) is largest then correct midtones. This can be done by applying both shadow and highlight correction, but modifying preferentially the midtone pixels:

$I'(r)=TM(L(r))FSH(I, aS0, aH0)+(1-TM(L(r)))I(r)$.

In other words, the fully automated result (and the original image) may be blended with a blend parameter that measures the membership in the midtone region.

If the user taps a second time on the image, according to various embodiments, processing may proceed in one on a number of ways. In one embodiment, the modified, updated image data each time is reevaluated responsive to each second "tap". The modified image data, generated as a result of the first tap for example, serves as the new source image for processing responsive to the next tap. In another embodiment, the source image data is maintained and all corrections are based on this unmodified image data. In this embodiment, the second tap would have no effect as described in the above implementation. For example, the second and later taps may have an effect by applying a correction with fixed values for aS and aH. The following parameter values may be set for this purpose: aS=0.1 and aH=0.05 (on a scale from 0 to 1).

A description of an exemplary use scenario, in which user double clicks on the image, is now provided. For input on a touch sensitive screen, the user may double tap (e.g., two taps in rapid sequence) on the image as displayed on the touch sensitive screen. In one embodiment, completely automatic image correction may be performed by using the automatic settings aS0 and H0 together:

Double click or double tap:

Totally Automatic Correction:

$$I'=FSH(I,aS0,aH0).$$

In this case, the correction is independent of where in the image the user double-clicks. In another embodiment, the designated image region may slightly influence the correction values.

If a user has selected an image feature that is deep in the shadows, the highlight correction may be slightly reduced:

$$aH0 \rightarrow aH0-k\,TS(L0).$$

Here, k is a constant with a small value. An exemplary value is k=0.1. Accordingly, if a shadow region has been designated by a user, the automatic highlight correction will be reduced by 0.1 (on a scale from 0 to 1). Similarly, if a highlight region has been designated by user, the image modification may be performed according to the following function:

$$I'=FSH(I,aS0-k\,TH(L0),aH0-k\,TS(L0)).$$

Determination of Neighborhood Luminance

An exemplary method of determining neighborhood luminance, as may be performed by the image characteristic detector 20 described above with reference to FIG. 1, is described. The exemplary method is performed with respect to a user-identified location with respect to a digital image. L(ro), the segmented neighborhood luminance, is a measure of the mean luminance in the neighborhood of a user-identified location (e.g., cursor (or finger) location), r0. The segmented neighborhood luminance is a measure that emphasizes contributions from a user-identified object in the image, and de-emphasizes contributions from other objects or image portions. In FIG. 7, for example, when the statue is user-identified, L should have contributions only from "statue pixels", and little or no contribution from "non-statue or sky/cloud pixels".

A Gaussian blur of the luminance values, $$l=\text{luminance}=[0.3\,r+0.59\,g+0.11\,b],$$

(where r=red, g=green, b=blue, normalized to range in value from 0 to 1) would not have this property, but would yield a measure of weighted mean luminance, weighted less heavily as in the distance from a user-identified point increases. A slight variation on this basic blur yields an approximation to a segmented luminance. This may, in one embodiment, be accomplished by the introduction of an additional weight which decreases with the magnitude of the luminance change between a center evaluation pixel and a contributing pixel:

$$L0=L(r0)=\text{Sum}[G(r-r0)f(l(r)-l(r0))l(r)]/\text{Sum}[G(r-r0)\,f(l(r)-l(r0))],$$

where the summations are over all pixel locations, r, in the neighborhood surrounding r0.

In practice, the summations may be limited to all pixels which fall within a circle centered at r0 with radius 3*R, R being the one-standard deviation radius of the Gaussian blur:

$$G(r-r0)=\exp[-[(x-x0)^2+(y-y0)^2]/(2R^2)].$$

The luminance change function, f, can also be taken as a Gaussian function:

$$f(l-l0)=\exp[-(l-l0)^2/(2d1^2)],$$

where d1 is a parameter which controls the tolerance to luminance changes. A large value produces a luminance change function which is roughly constant. In this case, the results are approximately that of a standard Gaussian blur. Smaller values reduce contributions from neighboring pixels which differ significantly in luminance from that of the center pixel. A typical useful value for d1 is ⅓.

Alternative methods for calculating luminance (L) include performing an image segmentation operation using one of the many methods known in the art, and then performing the standard Gaussian blur limited to only that segment in which the center pixel at r0 lies.

Manual Parameter Input

The above described exemplary embodiments have described (1) double clicking on the image, which then produces an automatic adjustment (e.g., correction) for both shadows and highlights and (2) single clicking, which produces an automatic correction for either shadows or highlights or midtones, depending upon which region has been chosen. In a further exemplary embodiment, user input may be received by a user clicking on the image and then performing a dragging operation. For example, where an input device is a touch-sensitive screen, this may involve a user touching and dragging along the screen. In the exemplary embodiment, function parameters (e.g., correction amount values) may be derived from the displacement of the cursor or finger away from the initial click (touch) point.

Figure 9:
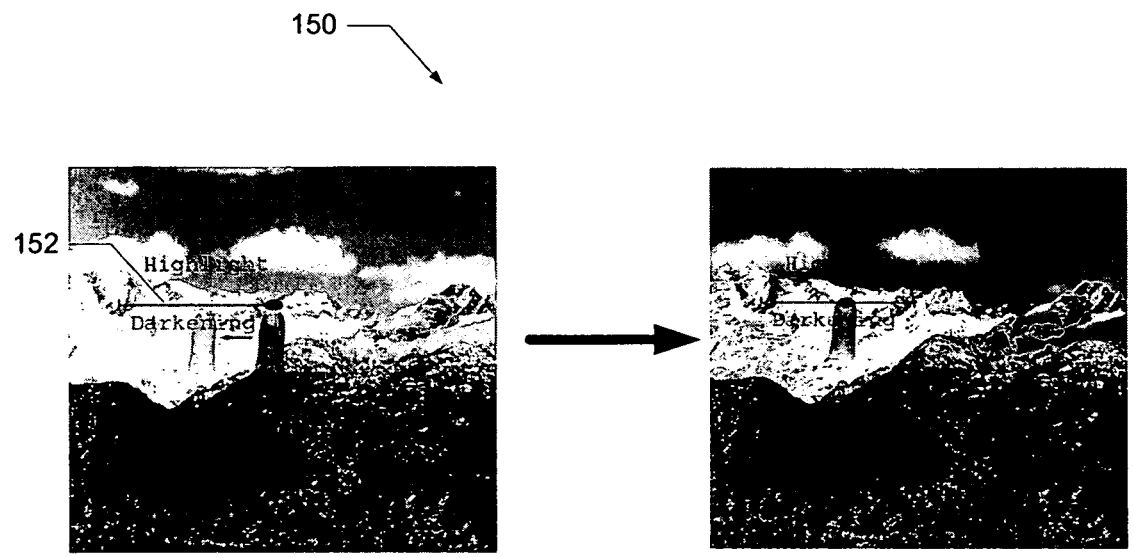

Exemplary embodiments may further provide the user with either a one-dimensional parameter adjustment or a two-dimensional parameter adjustment, as described above. FIG. 9 shows a pair of screenshots 150, displayed within a user interface (e.g., generated by the interface component 14) that facilitates a one-dimensional parameter input. Specifically, a user may point to a highlight region and drags his/her finger to the left, thus darkening the highlights. Optionally, the highlights may also be lightened by dragging to the right. Any drag towards the upper right will lighten and any drag towards the lower left will darken if this option is implemented. Referencing the screenshots 150 shown in FIG. 9, for a one-dimensional adjustment, the displacement of the finger or cursor is proportional to a lighting parameter value (e.g., either a shadow amount or a highlight amount parameter value, if the image region pointed to (before sliding the finger or cursor) is in shadows or highlights respectively). In one embodiment, the parameter value may be inputted to be either positive or negative. For example, referring to FIG. 9, upon clicking on the image, the user will be presented with a 'head-up' display 152 for the parameter. FIG. 9 shows an axis with the parameter value indicated by a filled circle or other icon. As the user moves the cursor, the icon follows the cursor as long as it lies within the range of allowed values.

Figure 10:
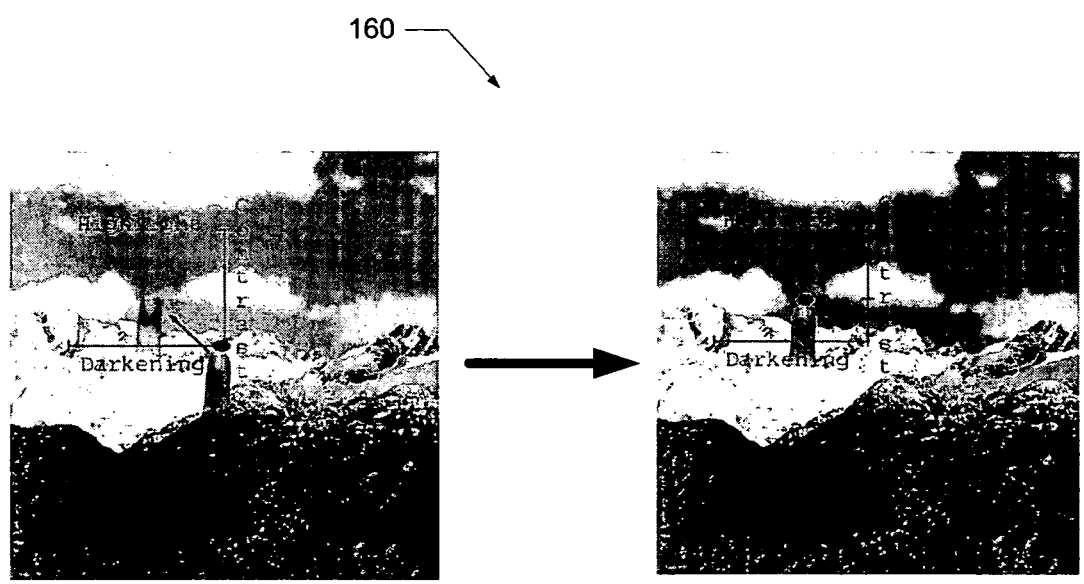

Referring now to the FIG. 10, screenshots 160 show an exemplary interface that facilitates the input of a two-dimensional parameter value (or two one-dimensional parameter values). Briefly, a user may point to a highlight region and drag his/her finger to the upper left, thus darkening the highlights while at the same time brightening them through a clipping contrast adjustment. More specifically, in a two-dimensional adjustment, a Shadow/Highlight correction parameter value may be specified by user input along the horizontal axis and a Clipping Contrast parameter value may be specified by user input along the vertical axis. If in shadows, the clipping contrast input adjusts the clipping parameter value for shadows; if in highlights, clipping contrast input adjusts the clipping parameter value for highlights. Clipping may be performed by stretching the range of pixel intensities in each color channel to fill the range of allowed values. For lighting correction, it may be undesirable to change the colors. Accordingly, single shadow and highlight clipping value may be selected, and all the color channels stretched according to this value.

Clipping:

Further details regarding the "clipping", according to an exemplary embodiment, are now discussed. Given a shadow clipping value xS and a highlight clipping value xH, which range from 0 to 1, a scaled image can be formed with pixel color values (r', g', b') from the original image pixel values (r, g, b):

$$r'=a(r-xS)+black$$

$$g'=a(g-xS)+black$$

$$b'=a(b-xS)+black,$$

where a=(white−black)/(xH−xS), with white=1.0 and black=0.0 (for colors normalized to lie within the range 0 to 1). Alternatively, black and white may be chosen to be other values, such as white=0.9 and black=0.1.

This scaling may be such that when r or g or b is equal to the clipping limit, xS, then the new color values are black and when equal to the clipping limit, xH, the new values are white.

The values for xS and xH may be chosen directly as parameter inputs. Alternatively, the parameter inputs may represent fractional amounts that are then used to determine xS and xH from a luminance distribution (histogram). In this case, an input parameter pS indicates that xS is to be chosen as the value of luminance for which a fraction, pS, of all the image pixels lie below it in intensity.

Likewise, a fraction, pH, of the image pixels lies above xH in intensity. In general, different values for xH and xS may be obtained for the different color planes using this approach. To obtain a common value so as to minimize color changes, the minimum of all the xS values and the maximum of all the xH values may be taken for the different color planes. Alternatively, the mean of the xS values and the mean of the xH values may be selected. In a further embodiment, the mean of the values obtained from the two differing approaches may be selected.

Shadow Clipping and Highlight Clipping

Figure 11:
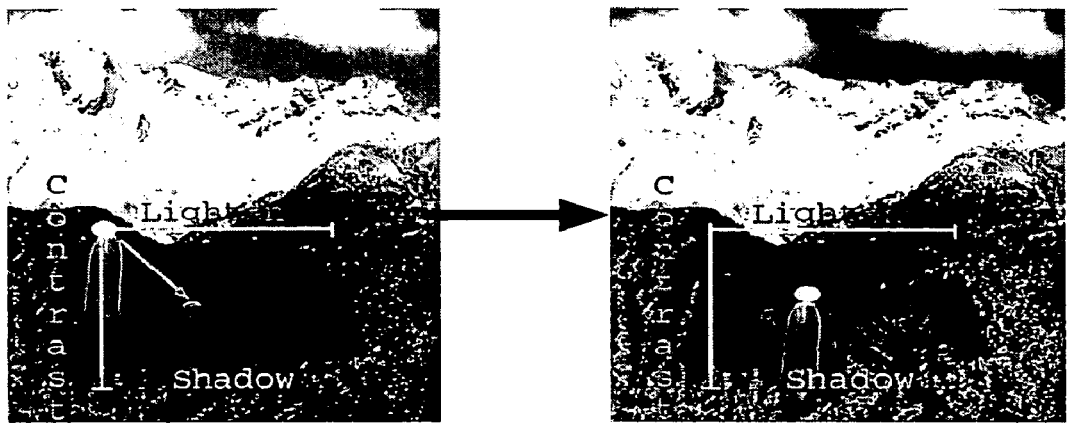

FIG. 11 shows a pair of screenshots 170, demonstrating a lighting of shadows, while increasing shadow clipping contrast. Specifically, note that the user points to a shadow region, and then performs a "dragging" operation to change the relevant parameter values.

When clipping shadows only, as is done when the user clicks on a shadow region, xH=1 and set xS may be set, in an exemplary embodiment, by choosing the value based on pS=0.01%=0.0001. Likewise, when clipping highlights only, xS=0 may be set and xH chosen based on pH=0.01%. Note that when the scaled values fall outside of the valid RGB range (0 to 1), they are clipped back into range.

Midtones

Figure 12:
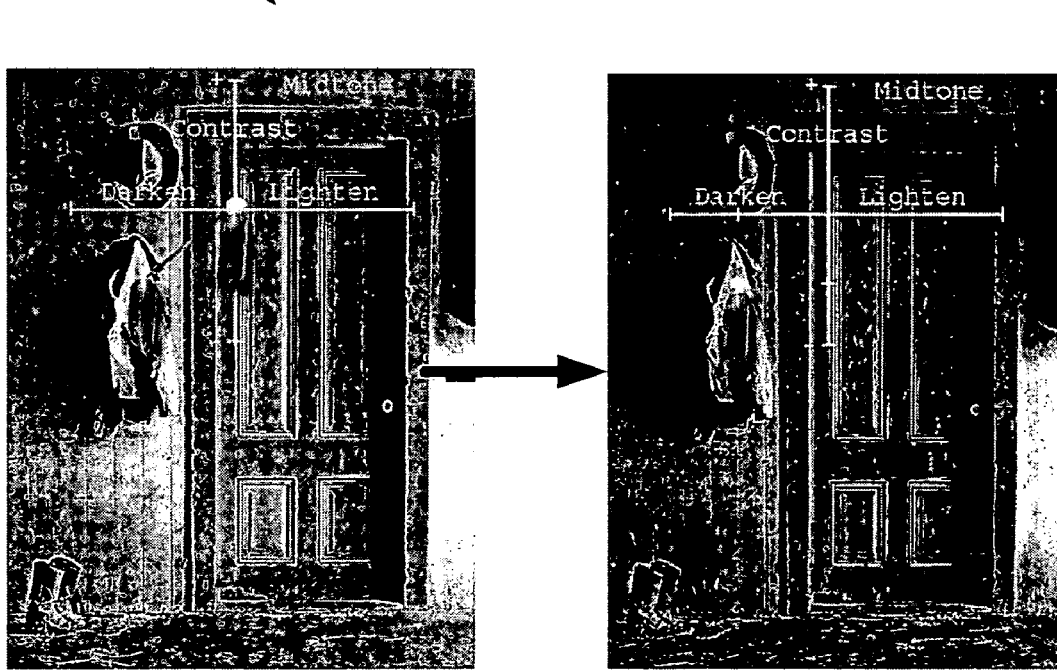

FIG. 12 shows a pair of screenshots 180, demonstrating user input of parameter values to decrease both midtone contrast and brightness. Specifically, in the illustrated example, a user points to a midtone region, and then performs a "dragging" operation to change the relevant parameter values.

When pointing to a midtone region and moving the cursor, both a midtone contrast adjustment and a brightness adjustment are provided for two-dimensional inputs. If only one-dimensional inputs are used, then one or the other can be chosen.

A brightness change may, in one exemplary embodiment, be performed by a so-called gamma correction, which involves raising the image values to some power:

$$I'=I^{gamma},$$

where values of gamma greater than one lead to darkening of the image and values less than one lead to brightening.

For midtone contrast, an S-shaped curve may be applied, in one exemplary embodiment, to increase contrast in the midtones at the expense of reduced contrast (and darkening in the shadows, brightening in the highlights) in the other regions. An inverted curve can be used to decrease contrast. In order to minimize changes to the non-midtone regions, changes to midtones may be preferentially restricted:

$$r'=(1-f)r+f\,contrast(r),$$

$$g'=(1-f)g+f\,contrast(g),$$

$$b'=(1-f)b+f\,contrast(b),$$

where $$f=1-8x(1-2x)$$

with $$x=\text{square}(lum-0.5),$$

$$lum=(0.3r+0.59g+0.11b).$$

$$contrast(I)=(I<=0.5):0.5(2I)^g$$

$$I>0.5):1-0.5(2-2I)^g.$$

In various embodiments of a two-dimensional input in user interface, the input axis may represent, for example:

Shadows: Shadow Amount and Shadow Clipping value

Midtones: Midtone Contrast and Brightness

Highlights: Highlight Amount and Highlight Clipping value

In various embodiments of a one-dimensional input user interface, two separate Lighting Correction tools, one for Shadow/Highlight adjustment and another for contrast adjustments may be provided:

Shadow/Highlight Tool

Shadows: Shadow Amount

Midtones: Brightness

Highlights: Highlight Amount

Contrast Tool

Shadows: Shadow Clipping Amount

Midtones: Midtone Contrast

Highlights: Highlight Clipping Amount

In a further embodiment, a color adjustment tool is provided to address color problems that may be present in a digital image. This tool may have following behaviors:

Double Click:

Automatic color correction, combining neutralization with color clipping.

Single Click:

Neutral Shadows Shadow color clip

Neutral Midtones Midtone color adjust

Neutral Highlights Highlight color clip

Colorful Region Enhance Color-Specific Saturation

Skin Tone Correct Skin Tone (optional)

Redeye: Correct Redeye

Click and Slide:

Neutral Shadows Color Temperature

Neutral Midtones Color Temperature

Neutral Highlights Color Temperature

Colorful Region Adjust Color-Specific Saturation and

Color Selection Tolerance (Fuzziness)

Skin Tone Adjust Skin Tone (optional)

Other behaviors are of course possible as well, such as changing the hue.

In one embodiment, image analysis performed by the image characteristics detector may involve, in addition to a determination of whether a region (or whole) of a digital image is in shadow, highlight or midtone, a determination of whether the color is close to the neutral or is "colorful" (e.g., not close to the neutral). The image characteristics detector may also perform a determination of whether or not the color is representative of human skin tones.

For example, for skin tone determination, the following function may be applied, $$p\text{Skin}=\exp[-k1(u1-u10)^2-k2(u2-u20)^2],$$

where $$u1=xr-0.5216xg, u2=0.5216xr+xg, \text{ and}$$

$$xr=r/[r+g+b], xg=g/[r+g+b],$$

$$u10=0.27, u20=0.52,$$

$$\text{sigma1}=0.05, \text{sigma2}=0.05,$$

$$k1=0.5/(\text{sigma1}^2), k2=0.5/(\text{sigma2}^2).$$

If pSkin>0.8, the image characteristic detector 20 may determine that an adjustment of modify skin tones is desirable. However, an image typically contains many other colors that are similar to skin tones. Consequently the option of adjusting skin tone is one that may, in one embodiment, not be generally available as part of a color adjustment tool, but may be invoked by special user request, such as the setting of a Preference value. Exemplary adjustments that may be applied to skin tones include a saturation or a hue adjustment.

For the determination of whether a color is neutral or colorful, the image characteristic detector 20 may, in one embodiment, utilize the chroma definition in Lab color space (or in perceptual logarithmic Lab space), with chrominance values a and b ranging in value from −1 to +1, $$C=\text{sqrt}(a^2+b^2).$$

If (C<0.2), and then the image characteristic detector may classify a color (Close to) as neutral; otherwise the image characteristics detector may classify a color as being "colorful". A description of the various exemplary algorithms follows.

Shadow/Highlight Color Clip

In one embodiment, clipping/stretching may be performed in a way that reduces brightness and contrast changes, in an attempt to leave the lighting unchanged but just modify the colors. Accordingly, color values may be scaled as follows:

For Shadow Clipping, a shadow color, (rS, gS, bS) is given. This may be the color of the pixel at the user-identified (e.g., cursor) location. It may alternatively be the color at which the color distributions contain some fraction pS (nominally set to 0.01%=0.0001) of image pixels between these values and the minimum color value of 0. The highlight color, (rH, gH, bH), can be set to be the color at which the color distributions contain a fraction pH of image pixels between these values and the maximum color value of 1.

$$r'=ar(r-rS)+lS$$

$$g'=ag(g-gS)+lS$$

$$b'=ab(b-bS)+lS,$$

where $$ar=(rH-lS)/(rH-rS),$$

$$ag=(gH-lS)/(gH-gS),$$

$$ab=(bH-lS)/(bH-bS),$$

Here lS is the luminance value of the shadow color (rS, gS, bS). This maps the shadow color to the neutral gray color (lS, lS, lS), leaving the luminance of this shadow pixel unchanged. The highlight color, (rH, gH, bH) is mapped to itself; it is unchanged.

For Highlight Clipping, the following mapping may be used, in one exemplary embodiment:

$$r'=ar(r-rS)+rS$$

$$g'=ag(g-gS)+rS$$

$$b'=ab(b-bS)+rS,$$

where $$ar=(lH-rS)/(rH-rS),$$

$$ag=(lH-gS)/(gH-gS),$$

$$ab=(lH-bS)/(bH-bS),$$

This is such that the shadow color remains unchanged, while the highlight color is mapped to the neutral gray color (lH, lH, lH). In this case, the highlight color is given by the color at the user-identified location (e.g., a cursor location) or is obtained from the color distributions in a similar manner to that of Shadow Clipping. The shadow color is produced from the color distributions in a similar manner. In the case of automatic color correction, both the shadow and the highlight color may be set by the color distributions.

Midtone Color Adjust

Figure 13:
Figure 13:
Figure 13:
Figure 14:
Figure 14:
Figure 14:

For this function, a midtone color (rM, gM, bM) is provided and, in the exemplary embodiment, the function operates to make this neutral gray. The effects of this exemplary function are illustrated in FIG. 13. Specifically, FIG. 13 shows a pair of screenshots 190, and illustrates that a user, by clicking on a fairly neutral highlight point, is able to neutralize the highlight to gray without modifying the brightness of the image. FIG. 14 shows a pair of screenshots 200, and illustrates that a user, by clicking on a fairly neutral midtone point, is able to map a color to neutral gray as well.

Dealing specifically with the functions to achieve the illustrated effects, the midtone color may be mapped to the gray color (lM, lM, lM) where:

$$lM=0.3r+0.59g+0.11b.$$

This may, in one embodiment, be achieved with a quadratic mapping in order to leave the extreme color values, (rS, gS, bS) and (rH, gH, bH) unchanged.

$$r'=lM+ar(r-rS)(rM-r)+cr(rH-r)(rM-r)$$

$$g'=lM+ag(g-gS)(gM-g)+cg(gH-g)(gM-g)$$

$$b'=lM+ab(b-bS)(bM-b)+cb(bH-b)(bM-b),$$

with $$ar=(rH-lM))/[(rH-rS)(rM-rH)], cr=(rS-lM)/[(rH-rS)(rM-rS)]$$

$$ag=(gH-lM))/[(gH-gS)(gM-gH)], cg=(gS-lM)/[(gH-gS)(gM-gS)]$$

$$ab=(bH-lM))/[(bH-bS)(bM-bH)], cb=(bS-lM)/[(bH-bS)(bM-bS)]$$

Note that the extreme colors may initially be found by the distribution method described above with pS=pH=0.01%. After a Shadow Color Clip is performed, the Shadow Color is determined as the selected color. And after a Highlight Color Clip, the Highlight Color is likewise determined.

Color Neutralization

RGB colors may be converted first to a perceptual logarithmic Lab color space, whereafter the chrominance values are modified according to:

$$a'=(1-f)a+f[a-<a>(1-lum)],$$

$$b'=(1-f)b+f[b-<b>(1-lum)],$$

where <a> is the average value of a over the whole image and likewise for <b>, $$lum=0.3r+0.59g+0.11b,$$

and f is a blending parameter that nominally takes on a value of 0.5.

The above provides an example of a first step in an automatic color correction function, provided by a color adjustment tool 62, which can be invoked when the user double clicks on the image. The second step is the apply color clipping as described above.

Color Temperature

Color temperature may be modified by converting from RGB color space to a CIE XYZ space with reference white point values X0, Y0, Z0, which depend upon ambient color temperature. For situations in which it is not necessary that the color shifts follow a precise blackbody spectral distribution and a user is only interested in modifying the ambience of the image, making it appear warmer or cooler in rough approximation to a blackbody spectrum, the below described function may be utilized.

Firstly, a rough blackbody spectral ratio functions (ignoring power law temperature modulations and integrations over spectral sensitivity functions for each color) may be determined as follows:

$$pr=[\exp(redT/T0)-1]/[\exp(redT/T)-1],$$

$$pg=[\exp(greenT/T0)-1]/[\exp(greenT/T)-1],$$

$$pb=[\exp(blueT/T0)-1]/[\exp(blueT/T)-1],$$

$$N=0.3pr+0.59pg+0.11pb,$$

$$redT=14388/0.62 \text{ degrees Kelvin},$$

$$greenT=14388/0.54 \text{ deg K},$$

$$blueT=14388/0.475 \text{ deg K}.$$

These are temperatures associated with light at wavelengths 0.62 um, 0.54 um and 0.475 um respectively.

In above example, T0 is the assumed initial ambient color temperature which can be set to 6500 deg K, which corresponds roughly to summer light. T is the desired color temperature. Larger temperatures than T0 produce cooler, bluer tones while lower temperatures produce warmer, redder tones.

All colors in the image may not be modified by multiplying each of the colors by the color temperature factors:

$$r'=fr\ r, g'=fg\ g, b'=fb\ b,$$

with $fr=pr/N, fg=pg/N, fb=pb/N$.

A variation of this approach recognizes that there are certain colors in the image which a user may not wish to modify, even as the color temperature is changing. If a shadow and/or highlight point and/or neutral midtone point have already been identified by a user, then the user may wish not to alter these. This can be accomplished, according to an exemplary embodiment of the present invention, by blending the color ratios with unity, depending upon the distance from one of these fixed colors:

$$fr'=xfr+(1-x),$$

$$fg'=xfg+(1-x),$$

$$fb'=xfb+(1-x),$$

where x is a function of color, c, which is normally unity except when the color is in the vicinity of one of these protected colors, in which case it vanishes. An example of such a function is:

$$x(c)=[1-\exp(-k\ dc1^2)][1-(\exp(-k\ dc2^2)][1-\exp(-k\ dc3^2)],$$

where dc1=c−c1, dc2=c−c2, dc3=c−c3.

To be specific, $dc1^2=(r-r1)^2+(g-g1)^2+(b-b1)^2$, where k is a constant which can be set to 10.0.

Figure 17:
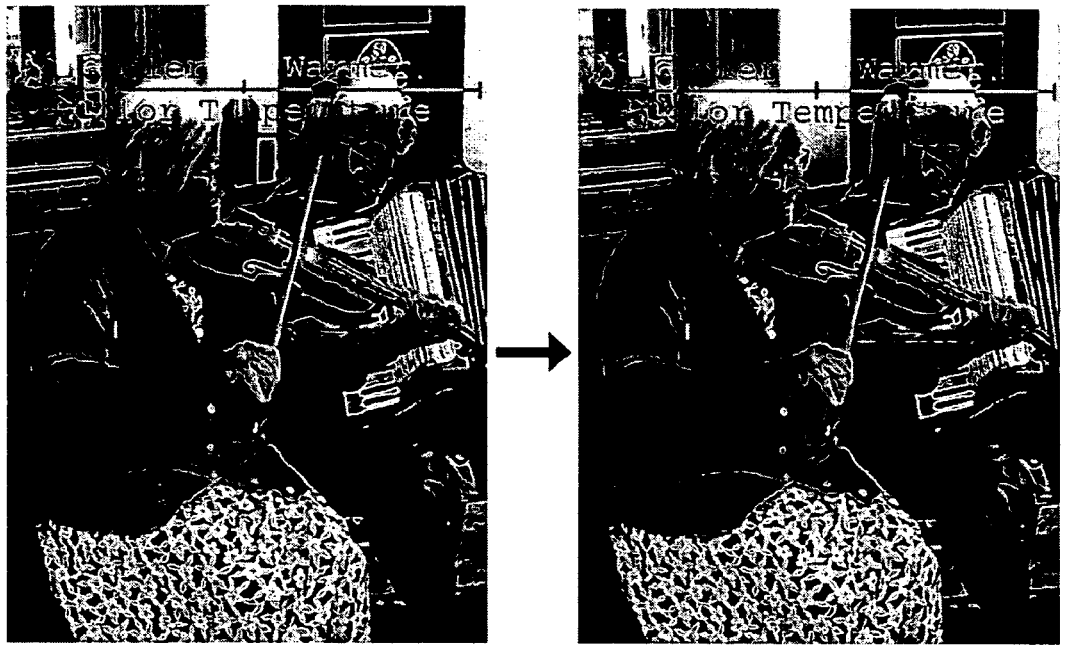

FIG. 17 shows a pair of screenshots 230, which illustrate how movement of a finger or cursor over a neutral color invokes display of a parameter input mechanism (e.g., the one-dimensional axis) for controlling ambient color temperature. Utilizing the parameter input mechanism, a user, by performing a "dragging operation, can make a displayed image warmer, as shown, or cooler.

Figure 18:
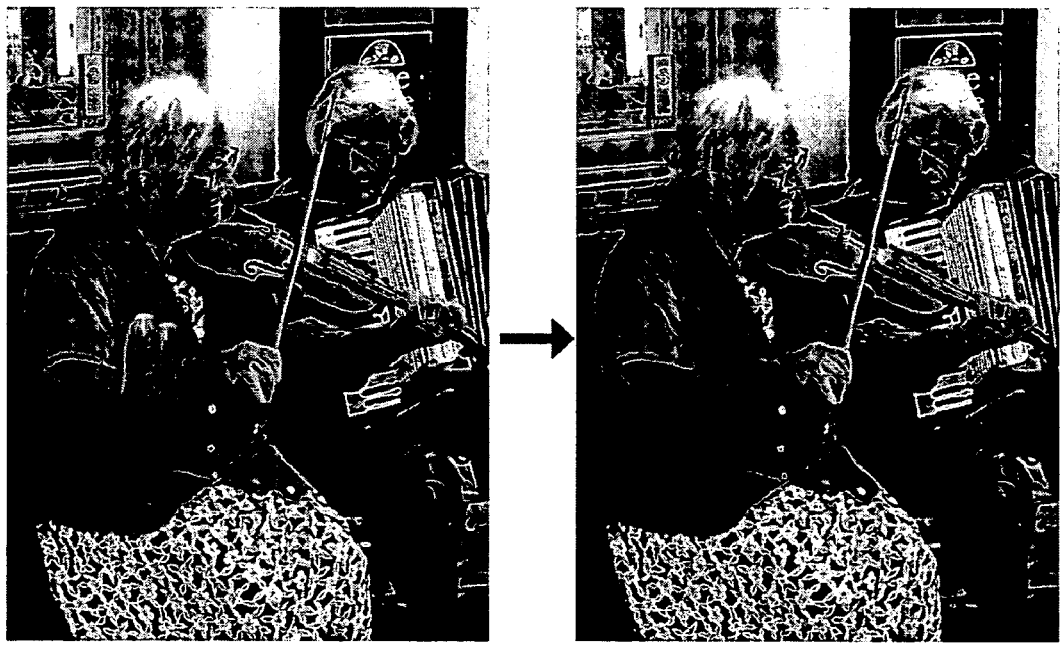

FIG. 18 shows a pair of screenshots 240, which illustrates how double-clicking anywhere on the image results in application of an automatic color correction, consisting of color neutralization, and shadow and highlight clipping.

Color-Specific Saturation

In one embodiment, a color-specific saturation function may be implemented as a combination of a color-based selection tool 52 (of the image region selection component 18 discussed above with reference to FIG. 2) and a saturation color adjustment tool (of the image adjustment tools 56, also discussed above with reference to FIG. 2).

The exemplary function may seek to saturate only the color identified by the user, or, more specifically, to saturate only similar colors within some tolerance or fuzziness. In one embodiment, this may be achieved by defining a color closeness function as follows:

$$f = \exp[-k[(r-r0)^2 + (g-g0)^2]/10^2],$$

$$k = 0.5/\text{fuzziness}^2.$$

All colors in the image are accordingly saturated in proportion to f:

$$r' = r + (r-10)f\text{ saturation},$$

$$g' = g + (g-10)f\text{ saturation},$$

$$b' = b + (b-10)f\text{ saturation},$$

with 10=0.3 g0+0.59 g0+0.11 b0.

Both fuzziness and saturation are user inputs.

Figure 15:
Figure 16:
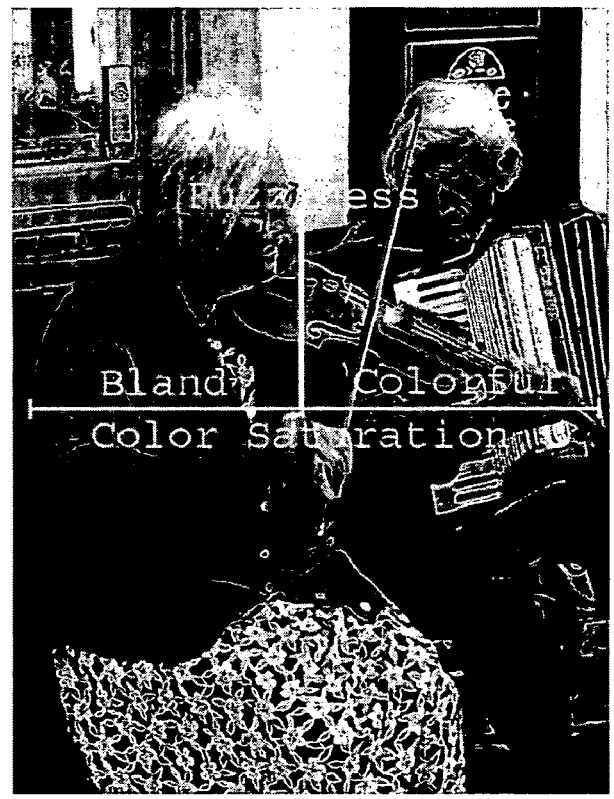

FIG. 15 shows a pair of screenshots 210, which illustrate the exemplary effect of a function whereby a user, by "clicking" on a colorful point, can invoke a color-specific saturation enhancement. Optionally, no color shift is performed until the user's finger is moved, in which case a two-dimensional axes is displayed (see FIG. 16, showing screenshot 220) to enable user input of parameter values for a color range tolerance (fuzziness) and a saturation parameter.

Redeye

Figure 19:
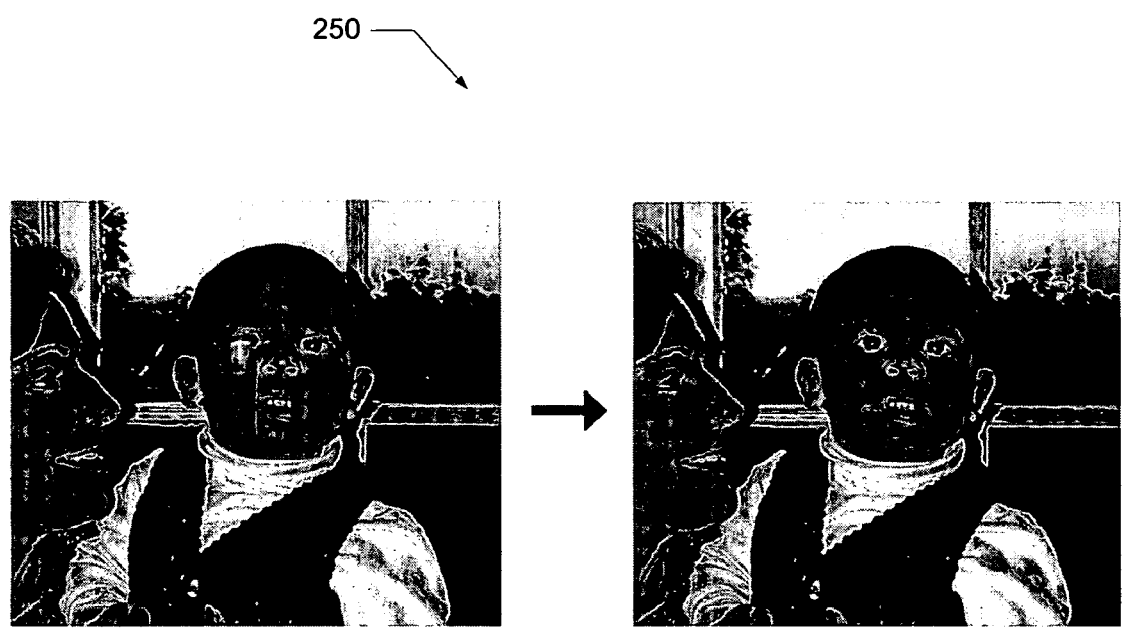

A "redeye reduction" function may be provided as a subset of the color adjustment tools 62, which form part of the image adjustment tools 56. The "redeye reduction" function may operate to detect and correct occurrences of "redeye" within digital images. For example, when user clicks on the image, a color-based selection and/or detection tool can be applied to a rectangular region surrounding a user-identified location (e.g., a cursor point). If the redeye detection probability exceeds a preset threshold, such as 90%, then the correction function can be invoked to automatically correct the redeye. FIG. 19 illustrates a pair of screenshots 250, showing how user identification of a location at or adjacent an occurrence of "redeye" within a source image may be utilized to generate an adjusted image, in which the redeye problem has been addressed.

Brushes

While certain embodiments of the invention have been described as operating across an entire image, it will be appreciated that these functions (e.g. tools) may implemented as "brushes". Accordingly, only a portion of the image in the vicinity of a user-identified location (e.g., the cursor or finger location) may be affected. In other words, effects of the functions may be localized. This can be achieved by blending the original image with the corrected image using a "brush profile", or by utilizing a blending parameter. For finite extent brushes, only a portion of the image needs to be modified.

Figure 20:
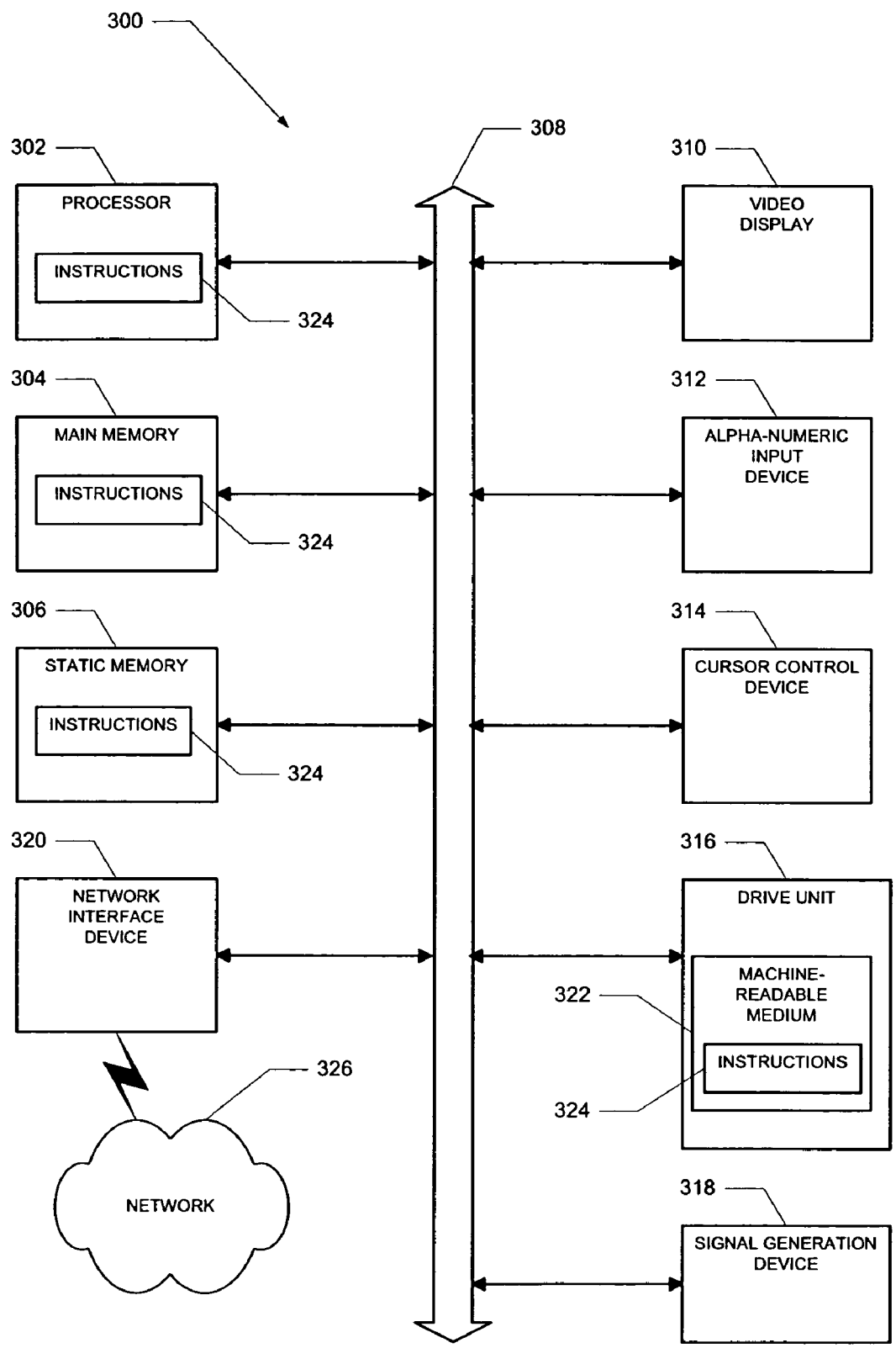
FIG. 20 is a block diagram illustrating a machine, in the exemplary form of a computer system, to execute a set of instructions, thereby to cause the machine to perform any of the exemplary methods described herein.

FIG. 20 shows a diagrammatic representation of machine in the exemplary form of a computer system 300 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, an embedded system or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, and optical and magnetic media.

Thus, a method and a system to modify digital data have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-readable medium including a set of instructions that, when executed by a machine, cause the machine to perform a method including:
receiving, at a digital data modification application, via a user interface, selection input to enable selection of digital data, the selection input identifying a first location and a second location with respect to the digital data, the first and second locations providing parametric input to a data modification component of the digital data modification application;
detecting a characteristic of the digital data; and
automatically configuring a function, of the data modification component, to modify the digital data, the automatic configuration of the function being based on the detected characteristic of the digital data and the parametric input.

2. The computer-readable medium of claim 1, wherein the automatic configuration of the function includes automatically configuring behavior of a data modification mechanism, of the data modification component, based on the detected characteristic of the digital data.

3. The computer-readable medium of claim 2, wherein the automatic configuration of the behavior of the data modification mechanism includes automatically selecting at least one parameter according to which the data modification mechanism is configured based on the detected characteristic of the digital data.

4. The computer-readable medium of claim 2, wherein the method includes receiving input from the user to select the data modification mechanism, from a plurality of data modification mechanisms of the data modification component.

5. The computer-readable medium of claim 1, wherein the method includes modifying the digital data utilizing the function of the data modification component.

6. The computer-readable medium of claim 1, wherein the method includes automatically modifying the digital data, utilizing the function of the data modification component, responsive to the reception of the selection input.

7. The computer-readable medium of claim 1, wherein the method includes presenting the function, of the data modification component, to a user for manual activation to modify the digital data.

8. The computer-readable medium of claim 1 wherein the parametric input is a magnitude value identifying a magnitude of a modification operation to be performed with respect to the digital data.

9. The computer-readable medium of claim 1, wherein the selection input identifies a type of modification to be performed by the data modification mechanism.

10. The computer-readable medium of claim 1, wherein the method includes detecting a first portion of the digital data based on the first location.

11. The computer-readable medium of claim 10, wherein the method includes display of modification mechanism information reflecting the function of the data modification component.

12. The computer-readable medium of claim 10, wherein the method includes detecting a second portion of the digital data based on the second location, detecting a second characteristic of the second portion of the digital data, and automatically configuring a further function, of the data modification component, the configuration of the further function being based on the detected second characteristic.

13. The computer-readable medium of claim 1, wherein the digital data is digital image data, and the configuration of the function includes configuration of any one of a group of data modification functions including a color, brightness, contract and lighting modification mechanism.

14. The computer-readable medium of claim 1, wherein the digital data is identified by spatial coordinates that are received as the selection input from a user.

15. The computer-readable medium of claim 1, wherein the detecting of the characteristic of the digital data includes performing an analysis relating to a portion of the digital data identified utilizing the selection input.

16. The computer-readable medium of claim 15, wherein the performance of the analysis includes analyzing data proximate to the portion of the digital data.

17. The computer-readable medium of claim 1, wherein the detecting of the characteristic of the digital data includes detecting a problem relating to the digital data, and wherein the function is configured to address the detected problem.

18. The computer-readable medium of claim 1, wherein the detecting of the characteristic of the digital data includes detecting context information for a portion of the digital data, and wherein the configuration of the function is performed utilizing the detected context information.

19. The computer-readable medium of claim 1, wherein the detecting of the characteristic of the digital data includes identifying a feature represented by the digital data, and wherein the configuration of the function is performed utilizing the identified feature.

20. The computer-readable medium of claim 1, wherein the method includes resolving an ambiguity with respect to the detection of the characteristic of the digital data.

21. A machine-implemented method to modify digital data, the method including:
   executing instructions, stored on a computer-readable medium, on a machine, the instructions to cause the machine to perform a method including:
   receiving, at a digital data modification application, via a user interface, selection input to enable selection of digital data, the selection input identifying a first location and a second location with respect to the digital data, the first and second locations providing parametric input to a data modification component of the digital data modification application;
   detecting a characteristic of the digital data; and
   automatically configuring a data modification component to modify the digital data, the automatic configuration being based on the detected characteristic of the digital data and the parametric input.

22. The machine-implemented method of claim 21, wherein the automatic configuration includes automatically configuring behavior of a data modification mechanism of the data modification component, based on the detected characteristic of the digital data.

23. The machine-implemented method of claim 22, wherein the automatic configuration of the behavior of the data modification mechanism includes automatically selecting at least one parameter according to which the data modification mechanism is configured based on the detected characteristic of the digital data.

24. The machine-implemented method of claim 22, wherein the executed instructions are to cause the machine to receive input from the user to select the data modification mechanism, from a plurality of data modification mechanisms of the data modification component.

25. The machine-implemented method of claim 21, wherein the executed instructions are to cause the machine to modify the digital data utilizing the data modification component.

26. The machine-implemented method of claim 21, wherein the executed instructions are to cause the machine to automatically modify the digital data, utilizing the data modification component, responsive to the reception of the selection input.

27. The machine-implemented method of claim 21, wherein the executed instructions are to cause the machine to present the data modification component to a user for manual activation to modify the digital data.

28. The machine-implemented method of claim 21, wherein the parametric input is a magnitude value identifying a magnitude of a modification operation to be performed with respect to the digital data.

29. The machine-implemented method of claim 21, wherein the selection input identifies a type of modification to be performed by the data modification mechanism.

30. The machine-implemented method of claim 21, wherein the executed instructions are to cause the machine to detect a first portion of the digital data based on the first location.

31. The machine-implemented method of claim 30, wherein the executed instructions are to cause the machine to display modification information identifying the data modification component.

32. The machine-implemented method of claim 30, wherein the executed instructions are to cause the machine to detect a second portion of the digital data based on the second location, detect a second characteristic of the second portion of the digital data, and automatically configure the data modification component to modify the digital data based on the detected second characteristic.

33. The machine-implemented method of claim 21, wherein the digital data is digital image data, and the configuration of the function includes configuration of any one of a group of data modification functions including a color, brightness, contract and lighting modification mechanism.

34. The machine-implemented method of claim 21, wherein the digital data is identified by spatial coordinates that are received as the selection input from a user.

35. The machine-implemented method of claim 21, wherein the detecting of the characteristic of the digital data includes performing an analysis relating to a portion of the digital data identified utilizing the selection input.

36. The machine-implemented method of claim 35, wherein the performance of the analysis includes analyzing data proximate to the portion of the digital data.

37. The machine-implemented method of claim 21, wherein the detecting of the characteristic of the digital data includes detecting a problem relating to the digital data, and wherein the function is configured to address the detected problem.

38. The machine-implemented method of claim 21, wherein the detecting of the characteristic of the digital data includes detecting context information for a portion of the digital data, and wherein the configuration is performed utilizing the detected context information.

39. The machine-implemented method of claim 21, wherein the detecting of the characteristic of the digital data includes identifying a feature represented by the digital data, and wherein the configuration is performed utilizing the identified feature.

40. A system to modify digital data, the system including:
first means for receiving selection input to enable selection of the digital data, the selection input identifying a first location and a second location with respect to the digital data, the first and second locations providing parametric input to a data modification component;
second means for detecting a characteristic of the digital data;
third means for modifying the digital data; and
fourth means for automatically configuring a function, of the data modification component, to modify the digital data, the automatic configuration of the function being based on the detected characteristic of the digital data and the parametric input.

41. A system to modify digital data, the system including:
a detector to detect a characteristic of the digital data;
a data modification component operable to modify the digital data; and
an interface to receive a selection input, the selection input identifying a first location and a second location with respect to the digital data, the first and second locations to provide parametric input to the data modification component;
a configurator to configure the data modification component to modify the digital data, the automatic configuration being based on the detected characteristic of the digital data and the parametric input.

42. The system of claim 41, wherein the data modification component includes plurality of data modification mechanisms, and wherein the configurator is automatically to configure behavior of a first data modification mechanism, based on the detected characteristic of the digital data.

43. The system of claim 42, wherein the configurator is automatically to select at least one parameter, according to which the first data modification mechanism is configured, based on the detected characteristic of the digital data.

44. The system of claim 42, wherein the configurator is automatically to select the first data modification mechanism, from the plurality of data modification mechanisms of the data modification component, based on the detected characteristic of the digital data.

45. The system of claim 42, wherein the configurator is to select the first data modification mechanism, from the plurality of data modification mechanisms of the data modification component, based on user input received via the interface.

46. The system of claim 42, wherein the data modification component is to modify the digital data utilizing a function of the data modification mechanism.

47. The system of claim 46, wherein the data modification component is to modify the digital data, utilizing the function, responsive receiving of the selection input.

48. The system of claim 41, wherein the parametric input is a magnitude value of a modification operation to be performed with respect to the digital data, and the data modification component is to perform the modification operation in accordance with the magnitude value.

49. The system of claim 41, wherein the selection input identifies a type of modification to be performed by the data modification mechanism.

50. The system of claim 41, wherein the detector is to detect a first portion of the digital data based on the first location.

51. The system of claim 50, wherein the interface is to display modification mechanism information identifying the data modification mechanism.

52. The system of claim 50, wherein the detector is to detect a second portion of the digital data based on the second location and is to detect a second characteristic of the second portion of the digital data, and the configurator is automatically to configure the data modification component, based on the detected second characteristic.

53. The system of claim 41, wherein the digital data is digital image data and the configuration includes configuration of any one of a group of data modification mechanisms including color, contrast and lighting modification mechanisms.

54. The system of claim 41, wherein the digital data is identified by spatial coordinates received as the selection input from a user.

55. The system of claim 41, wherein the detecting of the characteristic of the digital data includes performing an analysis relating to a portion of the digital data identified utilizing the selection input.

56. The system of claim 55, wherein the performance of the analysis includes analyzing data proximate to the portion of the digital data.

57. The system of claim 41, wherein the detecting of the characteristic of the digital data includes detecting a problem relating to the digital data, and wherein the data modification mechanism is configured to address the detected problem.

58. The system of claim 41, wherein the detecting of the characteristic of the digital data includes detecting context information for a portion of the digital data, and wherein the configuration is performed utilizing the detected context information.

59. The system of claim 41, wherein the detecting of the characteristic of the digital data includes identifying a feature represented by the digital data, and wherein the configuration is performed based at least partially on the identified feature.

60. The system of claim 41, including ambiguity selection logic to resolve ambiguity with respect to at least one of the selection input and the detected characteristic.

61. A computer-readable medium including a set of instructions that, when executed by the machine, cause the machine to perform a machine-readable medium including:
  detecting user-identification of a location of a digital image, as displayed within a user interface;
  detecting a characteristic of the digital image at or adjacent the user-identified location;
  selecting at least a first parameter of an image modification function, the selection being performed utilizing the detected characteristic;
  within the user interface, displaying a parameter input mechanism to receive a parameter value for the first parameter of the image modification function, the parameter input mechanism including a coordinate system to map locations within the user interface to parameter values for the first parameter; and
  selecting both the first parameter and a second parameter of an image modification function utilizing the detected characteristic,
  wherein the coordinate system includes a two-dimensional axis in order to map locations within the user interface to parameter values for both the first and second parameters of the image modification function.

62. The computer-readable medium of claim 61, wherein the detected characteristic is an undesirable characteristic of the digital image data and the selection of the first parameter includes selecting the image modification function as a corrective function to address the undesirable characteristic.

63. The computer-readable medium of claim 61, wherein the method includes detecting user identification of at least one further location of the digital image, mapping the at least one further location, utilizing the coordinate system, to a parameter value for the first parameter, and receiving the parameter value as an input.

64. The computer-readable medium of claim 61 wherein the axis is located on the user-identified location of the digital image.

65. A method including:
  executing instructions, stored on a computer-readable medium, on a machine, the instructions to cause the machine to perform a method including:
  detecting user-identification of a location of a digital image, as displayed within a user interface;
  detecting a characteristic of the digital image at or adjacent the user-identified location;
  selecting at least a first parameter of an image modification function, the selection being performed utilizing the detected characteristic;
  within the user interface, displaying a parameter input mechanism to receive a parameter value for the first parameter of the image modification function, the parameter input mechanism including a coordinate system to map locations within the user interface to parameter values for the first parameter; and
  selecting both the first parameter and a second parameter of an image modification function utilizing the detected characteristic,
  wherein the coordinate system includes a two-dimensional axis in order to map locations within the user interface to parameter values for both the first and second parameters of the image modification function.

66. The method of claim 65, wherein the detected characteristic is an undesirable characteristic of the digital image data and the selection of the first parameter includes selecting the image modification function as a corrective function to address the undesirable characteristic.

67. The method of claim 65, wherein the executed instructions are to cause the machine to detect user identification of at least one further location of the digital image, map the at least one further location, utilize the coordinate system, to a parameter value for the first parameter, and receive the parameter value as an input.

68. The method of claim 65, wherein the axis is located on the user-identified location of the digital image.

69. A system including:
  first means for detecting user-identification of a location with respect to a digital image;
  second means, responsive to the user-identification of the location, for detecting a characteristic of the digital image at or adjacent the location; and
  third means for selecting at least a first parameter of an image modification function, the selection being performed utilizing the detected characteristic;
  wherein the first means is further for causing display of a parameter input mechanism for receiving a parameter value for the first parameter of the image modification function, the parameter input mechanism including a coordinate system to map locations within the digital image to parameter values for the first parameter; and
  fourth means for selecting both the first and a second parameter of the image modification function utilizing the detected characteristic,
  wherein the coordinate system includes a two-dimensional axis in order to map locations within the user interface to parameter values for both the first and second parameters of the image modification function.

70. A system including:
  an interface to detect user-identification of a location with respect to a digital image;
  a detector, responsive to the user-identification of the location, to detect a characteristic of the digital image at or adjacent the location; and
  a configurator to select at least a first parameter of an image modification function, the selection being performed utilizing the detected characteristic;
  wherein the interface is further to cause display of a parameter input mechanism to receive a parameter value for the first parameter of the image modification function, the parameter input mechanism including a coordinate system to map locations within the digital image to parameter values for the first parameter; and
  wherein the configurator is to select both the first and a second parameter of the image modification function utilizing the detected characteristic, and the coordinate system includes a two-dimensional axis in order to map locations within the user interface to parameter values for both the first and second parameters of the image modification function.

71. The system of claim 70, wherein the detected characteristic is an undesirable characteristic of the digital image data, and the configurator is further to select the image modification function as a corrective function to address the undesirable characteristic.

72. The system of claim 70, wherein the interface is to detect user identification of at least one further location with respect to the digital image, and to map the at least one further location, utilizing the coordinate system, to a parameter value for the first parameter, and the configuration is to receive the parameter value as an input.

73. The system of claim 70, wherein the axis is located on the user-identified location within the digital image.

* * * * *

UNITED STATES PATENT AND TRADEMARK OFFICE
CERTIFICATE OF CORRECTION

PATENT NO. : 7,593,603 B1
APPLICATION NO. : 11/001340
DATED : September 22, 2009
INVENTOR(S) : Gregg D. Wilensky It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1331 days.

Signed and Sealed this

Twenty-first Day of September, 2010

David J. Kappos
*Director of the United States Patent and Trademark Office*